(12) United States Patent
McCarthy

(10) Patent No.: US 10,977,779 B2
(45) Date of Patent: Apr. 13, 2021

(54) LIGHT LEVEL MANAGEMENT WITH CONTENT SCAN ADAPTIVE METADATA

(71) Applicant: Dolby Laboratories Licensing Corporation, San Francisco, CA (US)

(72) Inventor: Sean Thomas McCarthy, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/961,252

(22) PCT Filed: Jan. 8, 2019

(86) PCT No.: PCT/US2019/012737
§ 371 (c)(1),
(2) Date: Jul. 10, 2020

(87) PCT Pub. No.: WO2019/139912
PCT Pub. Date: Jul. 18, 2019

(65) Prior Publication Data
US 2021/0049747 A1  Feb. 18, 2021

Related U.S. Application Data

(60) Provisional application No. 62/616,057, filed on Jan. 11, 2018.

(51) Int. Cl.
*G06T 5/00* (2006.01)
*G06T 5/50* (2006.01)
*G06T 7/90* (2017.01)

(52) U.S. Cl.
CPC ............... *G06T 5/009* (2013.01); *G06T 5/50* (2013.01); *G06T 7/90* (2017.01); *G06T 2207/10016* (2013.01); *G06T 2207/20208* (2013.01)

(58) Field of Classification Search
CPC .. G06T 5/007; G06T 5/00; G06T 5/50; G06T 2207/20208; G06T 2207/10016;
(Continued)

(56) References Cited

U.S. PATENT DOCUMENTS 9,554,020 B2 *  1/2017  Thurston, III ............ G06T 5/50
2013/0328907 A1  12/2013  Ballestad et al.
(Continued)

FOREIGN PATENT DOCUMENTS

CN   101727868    12/2011
WO   2017015397    1/2017

OTHER PUBLICATIONS

François et al., "High Dynamic Range and Wide Color Gamut Video Coding in HEVC: Status andPotential Future Enhancements", IEEE Transactions on Circuits and Systems for Video Technology, vol. 26, No. 1, Jan. 2016 (Year: 2016).*

(Continued)

*Primary Examiner* — Mekonen T Bekele

(57) ABSTRACT

A coded video sequence is received in a bitstream with a set of content scan adaptive metadata. It is ascertained if the set of content scan adaptive metadata is received. The set of content scan adaptive metadata includes: a maximum content light level parameter; a maximum frame average light level parameter. The maximum content light level parameter and maximum frame average light level parameter are both dependent on a scan type of the frames of the coded video sequence, the scan type being at least one of a progressive frame type, complimentary field pair type, macroblock-adaptive frame-field frame type, and individual field picture type.

22 Claims, 17 Drawing Sheets

--- determine a first image frame portion and a second image frame portion in a specific image frame 402 generate a first image field and a second image field to be interleaved into the first image frame portion 404 generate a third image field to occupy the second image frame portion 406 generate content light levels for a coded video sequence that comprises the specific image frame 408 transmit the coded video sequence, with the content light levels in a coded bitstream 410

--- generate a coded video sequence (CVS) for image frames 422 generate first content light levels for a first proper subset of image frames in the CVS 424 generate second content light levels for a second proper subset of image frames in the CVS 426 transmit the coded video sequence, along with the first and second content light levels, in a coded bitstream 428

(58) Field of Classification Search
CPC .... H04N 19/70; H04N 19/139; H04N 19/186; H04N 19/33; H04N 19/44; H04N 19/55; H04N 19/122; H04N 19/147; H04N 19/88; H04N 19/30; H04N 19/463; H04N 19/96; H04N 19/98; H04N 1/603; H04N 19/69

See application file for complete search history.

(56) References Cited

U.S. PATENT DOCUMENTS

| | | | | |
|---|---|---|---|---|
| 2016/0248939 | A1* | 8/2016 | Thurston, III | H04N 1/603 |
| 2017/0374390 | A1 | 12/2017 | Leleannec et al. | |
| 2018/0061026 | A1* | 3/2018 | Kozuka | G09G 5/10 |
| 2018/0063574 | A1* | 3/2018 | Stockhammer | H04N 21/4351 |
| 2019/0075325 | A1* | 3/2019 | Hwang | H04N 21/23614 |
| 2020/0035198 | A1* | 1/2020 | Kouno | G09G 5/04 |
| 2020/0219298 | A1* | 7/2020 | Urabe | G06T 5/007 |
| 2020/0302659 | A1* | 9/2020 | Urabe | G06T 11/001 |

OTHER PUBLICATIONS

White Paper Blu-ray Disc read-only format (Ultra HD Blu-ray) 2015.
CTA-861.3-A (2016) (formerly CEA-861.3) "HDR static metadata extensions".
ITU-H.265 "High Efficiency Video Coding" Dec. 2016.
ITU-R Rec. BT.1886 (Mar. 2011) "Reference electro-optical transfer function for flat panel displays used in HDTV studio production."
ITU-R Rec. BT.2035 (Jul. 2013) "A reference viewing environment for evaluation of HDTV program material or completed programmes".
ITU-R Rec. BT.2100-1 (Jun. 2017) "Image parameter values for high dynamic range television for use in production and international programme exchange."
ITU-T H.264 (Apr. 2017) "Advanced video coding for generic audiovisual services".
JCTVC-T0101. Fogg, C., Heiman, J., Smith, M. and Zink, M. (2015) "Content light level information SEI." JCT-VC 20th Meeting, Geneva, Feb. 2015.
Movie Labs "Common Metadata, TR-META-CM, v2.6" 2017.
SMPTE "Study group report high-dynamic range (HDR) imaging ecosystem." (2015).
SMPTE ST 2086:2014 "Mastering display color volume metadata supporting high luminance and wide color gamut images".
ULTR HD Forum Phase A Guidelines, Rev. 1.1 (2016).
Zia, Waqar "Resource Constrained Video Coding Systems" Diss. Technische Universitat Munchen, Jan. 27, 2012.
Zink, M. and Smith, M.D. (2015) "Managing HDR content production and display device capabilities" IBC 2015.

* cited by examiner determine a first image frame portion and a second image frame portion in a specific image frame 402 generate a first image field and a second image field to be interleaved into the first image frame portion 404 generate a third image field to occupy the second image frame portion 406 generate content light levels for a coded video sequence that comprises the specific image frame 408 transmit the coded video sequence, with the content light levels in a coded bitstream 410

*FIG. 4A* generate a coded video sequence (CVS) for image frames 422 generate first content light levels for a first proper subset of image frames in the CVS 424 generate second content light levels for a second proper subset of image frames in the CVS 426 transmit the coded video sequence, along with the first and second content light levels, in a coded bitstream 428

*FIG. 4B* receive a coded video sequence in an image bitstream 412 ascertain if a set of content scan adaptive metadata is received in the bitstream 414

*FIG. 4G* generate a set of content scan adaptive metadata to be included in an image bitstream 432 transmit the coded video sequence with the set of content scan adaptive metadata 434

*FIG. 4H*

LIGHT LEVEL MANAGEMENT WITH CONTENT SCAN ADAPTIVE METADATA

CROSS-REFERENCE TO RELATED APPLICATION

This application claims the benefit of priority from U.S. Provisional Patent Application No. 62/616,057 filed Jan. 11, 2018, which is hereby incorporated by reference in its entirety.

TECHNOLOGY

This invention relates to distribution and display of compressed digital video, and more particularly to improved light-level management for high-dynamic range (HDR) and standard-dynamic range (SDR) compressed video in which individual frames are encoded as any combination of progressive frames, complementary field pairs, and mixtures of field and progressive regions.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range or HDR relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus, while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT.1886, "Reference electro-optical transfer function for flat panel displays used in HDTV studio production," (March 2011), which is incorporated herein by reference in its entirety, defines the reference EOTF for flat panel displays. Given a video stream, information about its EOTF is typically embedded in the bitstream as metadata. Additional description can be found in ITU-R Rec. BT.2100-1, "Image parameter values for high dynamic range television for use in production and international programme exchange" (June 2017), which is incorporated herein by reference in its entirety. As used herein, the term "metadata" relates to any auxiliary information that is transmitted as part of the image bitstream (e.g., a coded bitstream, an H.265 bitstream, an H.264 bitstream, an HDMI video signal, etc.) and assists a decoder to render a decoded image. Such metadata may include, but are not limited to, color space or gamut information, reference display parameters, and auxiliary signal parameters, as those described herein.

Displays that support luminance of 200 to 1,000 cd/m$^2$ or nits typify a lower dynamic range (LDR), also referred to as a standard dynamic range or SDR, in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays" (hereinafter "SMPTE"), which is incorporated herein by reference in its entirety. Additional description can be found in SMPTE, "Study group report high-dynamic range (HDR) imaging ecosystem" (2015), which is incorporated herein by reference in its entirety. As appreciated by the inventors here, improved techniques for encoding and decoding video data that can be used to optimally and efficiently support best possible display capabilities of a wide variety of SDR and HDR display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 4A through FIG. 4H illustrate example process flows; and

DESCRIPTION OF EXAMPLE EMBODIMENTS

Figure 1:
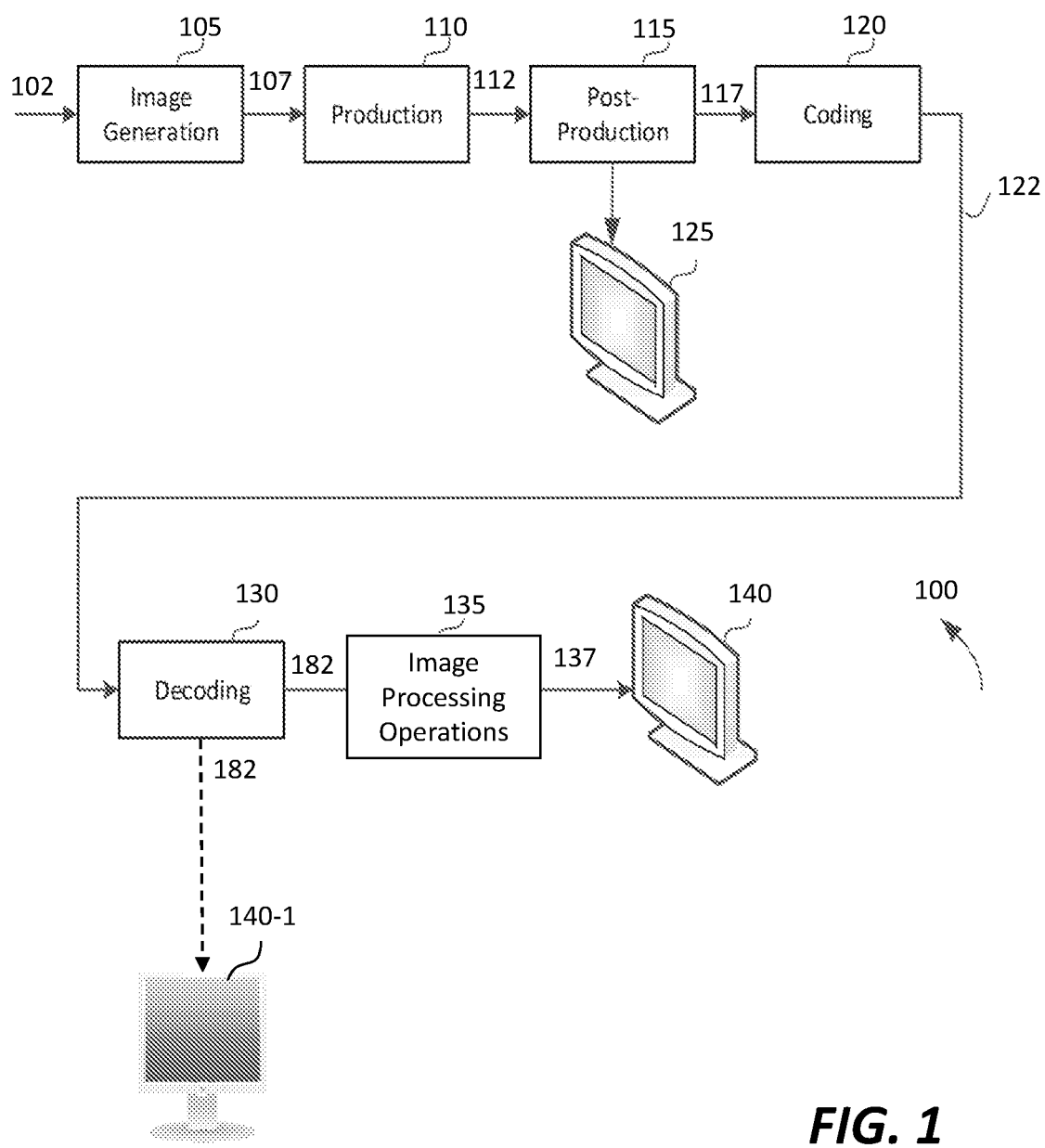
FIG. 1 depicts an example process of a video delivery pipeline.

Encoding and decoding video data with content light level information is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Techniques as described herein can be applied to video production, distribution, and display technologies to enable SDR and HDR video content to be consumed in a wide variety of viewing conditions on fixed and mobile displays having a variety of luminance, refresh rate, resolution, and size characteristics.

The variety of video content production, distribution, and display options creates an opportunity for inefficiency, as content creators, owners, distributors, consumers, and devices manufacturers each seek specific efficiency benefits in video production, distribution, and consumer experience.

Content creators and distributors benefit when individual assets can be consumed on a wide variety of displays in a wide range of environments without special processing and handling. For example, it is beneficial when a single compressed video asset can be distributed to and displayed on fixed-location indoor television displays, outdoor digital displays, mobile smartphones, tablets, laptops, and other displays. As another example, it is beneficial when a single compressed video asset can be distributed and displayed on both SDR and HDR displays of any type. Techniques as described herein can be used to devise systems and methods for information to be carried in compressed bitstreams and used to adapt the display of video content to specific display and viewing environment characteristics.

Consumers and device manufacturers benefit from efficient power management of displays. Power management can be particularly important for mobile devices where battery life is a major concern. Power management can also be particularly important for display of HDR content when average light levels affect energy consumption. Techniques as described herein can be used to devise systems and methods for information to be carried in compressed bitstreams and used to manage energy consumption based on the characteristics of the video asset and the display device.

Content creators and owners benefit from preservation of artistic intent, which means that the perceptual qualities of video content as observed by a professional in a reference viewing environment such as a mastering studio or live-production facility are consistently predictive of the perceptual qualities of video content observed by a consumer. Preservation of artistic intent is particularly important for consumer displays that have luminance characteristics significantly different (brighter or darker) from professional reference displays. Preservation of artistic intent is also important for consumer displays viewed in ambient light levels significantly different from professional reference viewing environments. Techniques as described herein can be used to devise systems and methods for information to be carried in compressed bitstreams and used to preserve artistic intent across a wide range of displays and viewing environments.

Content creators, owners, distributors, consumers, and devices manufacturers benefit when video standards promote interoperability between devices and services, which in turn promotes more consumer choice and better economies of scale in manufacturing and distribution. Content light level information generated under techniques as described herein can be carried in compressed bitstreams and used for display management are compatible with video standards. As used herein, a content light level in content level information refers to a collective light level (or a group light level) such as an maximum, average, or minimum light level of the entire image area, a salient part of the entire image area, a visually significant image area, and so forth, of one or more image frames, one or more coded video sequences, one or more programs in a playlist, and so forth.

Content creators, owners, distributors, consumers, and devices manufacturers also benefit when different video compression standards provide equivalent consumer experiences on decoding devices having different capabilities. For example, it is beneficial to deliver equivalent artistic intent, display light-level management, and power management capabilities using either HEVC or AVC compression standards. Content creators, owners, distributors, consumers, and devices manufacturers also benefit when compressed video can be transcoded from one video compression standard to another and preserve information that can be used for display management. For example, it is beneficial to transcode HEVC-compressed video to AVC-compressed video to deliver equivalent consumer video experiences to displays driven by AVC-only decoders. Techniques as described herein can be used to generate information in compressed bitstreams used for display management that can be relayed across digital display interface specified by industry standards such as HDMI, and to devise systems and methods that enable interoperability between video standards for consistent display light-level management on devices having different video-standard capabilities.

Thus, some or all of the techniques as described herein can be applied to video production, distribution, and display technologies to deliver a number of light-level management benefits including but not necessarily limited to those described above.

Content light levels such as MaxCLL and MaxFALL can be specified in units of absolute luminance (e.g., candelas per square meter or $cd/m^2$, etc.) and are thus readily applicable to video content that has been encoded with video code values that represent absolute luminance. Additionally, optionally or alternatively, the content light levels in absolute luminance values can be used with Electro-Optical Transfer Functions (EOTF) that relates video code values as absolute luminance to displayed image, or other industry-standard EOTFs that relate video code values to luminance relative to peak display luminance. Thus, for example, the content light levels such as MaxCLL and MaxFALL may be applied to HDR-content encoded using the absolute-luminance EOTF specified by SMPTE ST 2084, or content encoded using relative-luminance EOTFs such as specified by ITU-R Rec. BT.1866 for HDTV studio production and by ITU-R Rec. BT.2100-1 for Hybrid-log Gamma (HLG) HDR television production.

Techniques as described herein can be applied to operational scenarios (e.g., under Blu-ray Disc Association or BDA, etc.) in which MaxCLL and MaxFALL can be used to represent maximum values for an entire playback sequence of video streams in a playlist, as well as to operational scenarios (e.g., live production and distribution, etc.) in which maximum values may or may not be available until the program ends. Additionally, optionally or alternatively, techniques as described herein can be applied to operational scenarios (e.g., content insertion, content with different content light levels inserted or mixed into display content, etc.) in which the content light levels such as MaxCLL and MaxFALL can be applied unambiguously to programming that contains dynamically inserted content such as advertising. Additionally, optionally or alternatively, techniques as described herein can be applied to operational scenarios (e.g., overlaid graphics, subtitles, graphics with different content light levels inserted or mixed into display content, etc.) in which the content light levels such as MaxCLL and MaxFALL can be applied unambiguously to programming that contains dynamically overlaid graphics such as subtitles.

Content light level information as described herein can be delivered from an upstream device (e.g., a video encoder, a video transcoder, a video decoder, a broadcast server, a media streaming server, a video source device, etc.) to a downstream device (e.g., a video encoder, a video transcoder, a video decoder, a broadcast client, a media streaming client, a video destination device, a display device, a mobile computer, etc.) in a video signal of any of a wide variety of video signal formats or bitstream coding syntaxes. In some embodiments, the content light level information can be encoded/written or decoded/read in compliance with a video standard such as (e.g., TR-META-CM, CTA-861.3-A, High-Definition Multimedia Interface (HDMI) specification, HEVC, AVC, H.264, H.265, BDA, Ultra HD, Blu-ray, etc.). Example description of TR-META-CM can be found in MovieLabs "Common Metadata, TR-META-CM, v2.6" (2017), which is incorporated herein by reference in its entirety. Example description of H.265 can be found in ITU-T H.265, "High efficiency video coding" (December 2016), which is incorporated herein by reference in its entirety. Example description of Ultra HD can be found in Ultra HD Forum "Phase A guidelines, Rev 1.1" (2016), which is incorporated herein by reference in its entirety. Example description of Blu-ray can be found in Blu-ray Disc Association, "White paper Blu-ray Disc read-only format (Ultra HD Blu-ray) audio visual application format specifications for BD_ROM version 3.0" (2015), which is incorporated herein by reference in its entirety.

The content light level information may be delivered with type and/or interpretation information to specify how the content light level information is to be interpreted by a recipient device. The type and/or interpretation information for the content light level information can specify whether values in the content light level information are representative of the input video or decoded output bitstream, and thus distinguish the output format from the scan format (progressive and interlaced) of the input format which can be different than the output format. This may be helpful in operational scenarios in which input frames comprised of complementary field pairs can be encoded as a sequence of a non-interleaved image frame (e.g., a frame with a single field, etc.) or as single progressive-frames each of which may contain both (e.g., top and bottom, etc.) fields. The calculation of the values in the content light level information for the output bitstream may depend on the coding scan mode. This may also be helpful in operational scenarios in which a complementary field pair having one bright field and one dimmer field may produce different content light level information values if the values where calculated for individual field pictures rather than a frame containing both fields. Such complementary field pairs may be common for video content representing flashes of light, fade to white, and fade to black. Such video complementary field pairs may also be common for film-originated 24 frame-per second progressive video frames are coded as telecined field pairs. In such scenarios, a field from one frame can be paired with a field from a different frame, thus resulting in a difference in content light level information values between the input and output.

The type and/or interpretation information for the content light level information can be used to disambiguate interpretation of values in the content light level information for live encoding and transcoding. This can be helpful in operational scenarios in which calculation of the upper bounds for the nominal target brightness light level of the pictures of the CLVS may not be completed until the sequence is completely encoded. Thus, use cases supported under techniques as described herein support not only video-on-demand, file-based encoding, and so forth, but also live video distribution use cases, such as sports, news, live entertainment, on-the-fly transcoding, and so forth.

Some video signals may be coded in a video standard (e.g., HEVC, etc.) that is more restrictive (e.g., either an individual field or a frame, etc.) than other video standards (e.g., AVC, any of individual field pictures, frame pictures, and mixed field-frame pictures or macro-block adaptive field-frames (MBAFFs), etc.) in terms of the total number and diversity of codec scan modes available for encoding and/or decoding. The greater flexibility in the latter video standards such as AVC with respect to allowed scan type and mixing of scan types within frames and within sequences results in more ways in which the values in the content light level information can differ between input and output. Content light level metadata that includes content light levels and their respective types, as generated under techniques as described herein, can be used to correctly interpret values in the content light levels for a wide variety of video signals including but not limited to AVC, HEVC, and so forth.

Example embodiments described herein relate to encoding content light level information with video data. For a specific image frame in which pixels are generated from source pixels in a set of source images, a first image frame portion in the specific image frame and a second image frame portion in the specific image frame are determined. The specific image frame is to be rendered for a frame interval by a display device. A first image field and a second image field that are to be interleaved into the first image frame portion in the specific image frame are generated respectively from a first image and a second image in the set of source images. The first image field is to be rendered for a first frame sub-interval of the frame interval. The second image field is to be rendered for a second frame sub-interval of the frame interval. The second frame sub-interval of the frame interval is subsequent to the first frame sub-interval of the frame interval. A third image field used to occupy all pixel positions in the second image frame portion in the specific image frame is generated from a third image in the set of source images. One or more content light levels for a coded video sequence to be encoded with a plurality of image frames including the specific image frame are generated based at least in part on pixels of the first image field, the second image field and the third image field in the specific image frame. The coded video sequence, along with content light level metadata that includes the one or more content light levels, is transmitted in a image bitstream.

Example embodiments described herein relate to decoding content light level information with video data. A image bitstream, which comprises a coded video sequence encoded with a plurality of image frames including a specific image frame, is decoded into the plurality of image frames and content light level metadata that includes one or more content light levels for the coded video sequence. The specific image frame comprises pixels generated from source pixels in a set of source images and is to be rendered for a frame interval. The one or more content light levels for the coded video sequence are generated based at least in part on pixels of a first image field, a second image field and a third image field in the specific image frame. The first image field and the second image field that are to be interleaved into a first image frame portion in the specific image frame are generated respectively from a first image and a second image in a set of source images. The first image field is to be rendered for a first frame sub-interval of the frame interval. The second image field is to be rendered for a second frame sub-interval of the frame interval. The second frame sub-interval of the frame interval is subsequent to the first frame sub-interval of the frame interval. The third image field used to occupy all pixel positions in a second image frame portion in the specific image frame is generated from a third image in the set of source images. Based at least in part on the one or more content light levels for the coded video sequence, one or more image processing operations are performed on the specific image frame to generate a display image optimized for a target display device. The optimized display image is caused to be rendered on the target display device.

Example embodiments described herein relate to encoding content light level information with video data. A coded video sequence is generated for a plurality of image frames. Each image frame in the plurality of image frames is to be rendered by a display device for a respective frame interval in a plurality of frame intervals. Each image frame in the plurality of image frames is of an image frame type among a plurality of image frame types that include a fully non-interleaved image frame type, a fully interleaved image frame type, a partly non-interleaved partly interleaved image frame type, and so forth. Based at least in part on pixels of a first image frame of a first image frame type, one or more first content light levels are generated for a first proper subset of image frames in the coded video sequence. The first proper subset of image frames includes the first image frame. Based at least in part on pixels of a second image frame of a second image frame type different from the first output image type, one or more second content light levels are generated for a second proper subset of image frames in the coded video sequence. The second proper subset of image frames includes the second image frame. The first proper subset of image frames shares no common image frame with the second proper subset of image frames. The coded video sequence, along with image metadata that includes the one or more first content light levels and the one or more second content light levels, is transmitted in a image bitstream.

Example embodiments described herein relate to decoding content light level information with video data. A image bitstream, which comprises a coded video sequence, is decoded into a plurality of image frames and image metadata that includes the one or more first content light levels and the one or more second content light levels. Each image frame in the plurality of image frames is to be rendered for a respective frame interval in a plurality of frame intervals. Each image frame in the plurality of image frames is of an image frame type among a plurality of image frame types that include a fully non-interleaved image frame type, a fully interleaved image frame type, a partly non-interleaved partly interleaved image frame type, and so forth. The one or more first content light levels are generated for a first proper subset of image frames in the coded video sequence based at least in part on pixels of a first image frame of a first image frame type in the first proper subset of image frames. The one or more second content light levels are generated for a second proper subset of image frames in the coded video sequence based at least in part on pixels of a second image frame of a second image frame type different from the first output image type. The second proper subset of image frames includes the second image frame. The first proper subset of image frames shares no common image frame with the second proper subset of image frames. Based at least in part on the one or more first content light levels, one or more first image processing operations are performed on the first proper subset of image frames to generate a first subset of display image optimized for a target display device. The first subset of display images is caused to be rendered on the target display device. Based at least in part on the one or more second content light levels, one or more second different image processing operations are performed on the second proper subset of image frames to generate a second subset of display image optimized for the target display device. The second subset of display images is caused to be rendered on the target display device.

Example Video Delivery Processing Pipeline

FIG. 1 depicts an example process of a video delivery pipeline (100) showing various stages from video capture to video content display. Various system constituents may be implemented through software, hardware, or a combination of software and hardware. Any, some or all of these system constituents may be interconnected and communicated directly, or through one or more networks.

A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide the video data (107). In a production phase (110), the video data (107) is edited to provide a video production stream (112).

The video data of the production stream (112) is then provided to a processor for post-production editing (115). The post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, manual and/or automatic scene cut information generation, image cropping, addition of computer-generated visual special effects, etc.) may be performed at the post-production editing (115) to yield a release version of image frames (117), each of which comprises an array of pixel values (e.g., an array of luma samples in a monochrome format, an array of luma samples and two corresponding chroma samples in a color format, an array of RGB samples, etc.) representing an HDR image or SDR image.

The image frames (117) may be encoded into a set of coded video sequences. A coded video sequence (CVS) may comprise a sequence (or plurality) of consecutive (in a time order) image frames that are to be rendered (in the same time order) by a downstream display device for a sequence (or plurality) of consecutive frame intervals (in the same time order). Each of image frame in the coded video sequence is (designated) to be rendered for a different respective frame interval in the sequence of consecutive frame intervals. Each image frame in the plurality of image frames in the coded video sequence is of an image frame type among a plurality of image frame types that include a fully non-interleaved image frame type, a fully interleaved image frame type, a partly non-interleaved partly interleaved image frame type, and so forth.

During post-production editing (115), the HDR or SDR images as represented in the image frames (117) may be viewed on a reference display (e.g., reference HDR display, reference SDR display, etc.) that supports a reference dynamic range by a colorist who is performing post-production editing operations on the HDR or SDR images (117) as represented in the image frames (117).

The coded video sequences in the image frames (117) are compressed (or encoded) by the coding block (120) into a image bitstream (122). In some embodiments, the coding block (120) may include audio and video encoders, such as those defined by ATSC, DVB, DVD, Blu-Ray, HEVC, AVC, H.265, H.264, and other delivery formats, to generate the image bitstream (122).

In some embodiments, the image bitstream (122) is encoded with the HDR or SDR images (in the image frames (117)) that preserve the artistic intent with which the HDR or SDR images are generated in the post-production editing (115).

The image frames (117) may be encoded into video data in a video signal (e.g., an 8-bit SDR video signal, a 10-bit SDR video signal, etc.) that is backward compatible (or alternatively non-backward compatible) with a wide variety of HDR or SDR display devices (e.g., HDR displays, SDR displays, etc.).

The coded bit stream (122) is further encoded with image metadata including but not limited to some or all of: image metadata portions for local dimming operations, image metadata portions for global dimming operations, image metadata portions for display management (DM) operations, image metadata for codeword mapping, etc., that can be used by downstream decoders to perform related image processing operations.

The image bitstream (122) is then delivered downstream to decoding and playback devices such as television sets, set-top boxes, movie theaters, and the like. In a receiver (or a downstream device), the image bitstream (122) is decoded by decoding block (130) to generate decoded images 182, which may be the same as the HDR or SDR images represented in the image frames (117) subject to coding errors or quantization errors, for example generated by the coding block (120) and the decoding block (130). In scenarios in which a first target display 140-1 supports the same display capabilities of the reference display (125) with which the HDR or SDR images represented in the image frames (117) are color graded, the decoded images (182) can be rendered and directly watchable on the first target display (140-1). In some embodiments, the receiver may be attached to a second target display 140, which may not support the same display capabilities of the reference display (125). In that case, the decoding block (130) may perform device-specific image processing operations 135 such as display-device specific local dimming operations based on the image metadata portions for local dimming operations, display-device specific global dimming operations based on the image metadata portions for global dimming operations, display-device specific DM operations based on the image metadata portions for DM operations, and so forth, with respect to the decoded images (182) in order to generate optimized display images 137 for the second target display (140).

Delivery of SDR or Non-SDR Content with Compressed Metadata

Techniques as described herein can be used to significantly compress image metadata including but not limited to DM metadata used in DM operations. These techniques are well suited for a wide range of different operational scenarios, and may be used to compress the image metadata so as to significantly minimize overheads in transmitting the image metadata and thus to enable the image metadata and image data to be transmitted at relatively low bit rates. In some example embodiments, the techniques as described herein may be made to compress the image metadata that accompanies the SDR images (117), including but not limited to the DM metadata to allow the SDR images with the SDR image (117) and the image metadata to be transmitted in the image bitstream (122) under relatively low bit rates.

Since a great number of videos/movies have been created, stored, and/or published in the world in the past several decades as SDR content encoded for transmission at relatively low bit rates, the techniques as described herein can be used to generate significantly compressed image metadata in coded streams that carry, or are backward compatible with, a wide range of previously created SDR content. As a result, the image metadata can carry a (comparatively) relatively large amount of data to enable optimizing image processing operations including but not limited to DM operations for a wide variety of display devices and/or media players.

Additionally, optionally, or alternatively, these techniques can also be extended to generate significantly compressed image metadata in coded streams that may or may not be single layer video signals. Additionally, optionally, or alternatively, these techniques can also be extended to generate significantly compressed image metadata in coded streams that may be used for generating SDR, non-SDR or HDR content from the image bitstreams.

In some embodiments, the compression of the image metadata may be realized using extension blocks (or metadata blocks) that are supported by a wide variety of media processing devices in the field or in new deployments. More specifically, the extension blocks can be used to compress image metadata that accompanies previously created SDR content, and may also be used to compress present or future image metadata that accompanies present or future SDR (or even non-SDR media content) encoded at a wide variety of bit rates. In some embodiments, at least a part (e.g., client-side, decoder-side, etc.) of the techniques can be implemented by or deployed in a wide variety of TVs, mobile devices, set-top boxes, smart players, and so forth, to receive and make use of significantly compressed image metadata that accompanies SDR (or even non-SDR content) in a wide variety of image processing operations including but not limited to DM operations.

Furthermore, in operational scenarios in which SDR content is specifically optimized for SDR display devices, such (e.g., backward compatible, etc.) SDR content can be delivered to a wide variety of downstream decoding devices, including but not limited to those devices that only support SDR rendering. These devices can ignore any parts (e.g., unsupported DM extension blocks, etc.) of image metadata that accompany the SDR content and that are not supported by the devices.

For example, a first device with a first decoder (e.g., a decoder already deployed in the field, etc.) that receives a image bitstream containing image metadata in a compression format as described herein may not recognize some relatively new extension blocks used to compress the image metadata and can fall back to use default values (e.g., DM static values, etc.) known or accessible to the device. The first decoder can keep decoding and processing other parts of the image metadata in the compression format that are supported by the first decoder.

In comparison, a second device with a second decoder (e.g., a newly released decoder, etc.) that receives such a image bitstream can recognize the relatively new extension blocks, and can decompress the compressed image metadata in the image bitstream and perform image processing operations (e.g., DM operations, etc.) based on dynamic or passed-in values in the relatively new extension blocks. The compression format such as the relatively new extension blocks may be implemented by or deployed in a wide variety of TVs, mobile devices, set-top boxes, smart players, and so forth, to receive and make use of significantly compressed image metadata that accompanies SDR or non-SDR content in a wide variety of image processing operations including but not limited to DM operations.

Coded Video Sequences

Figure 2A:
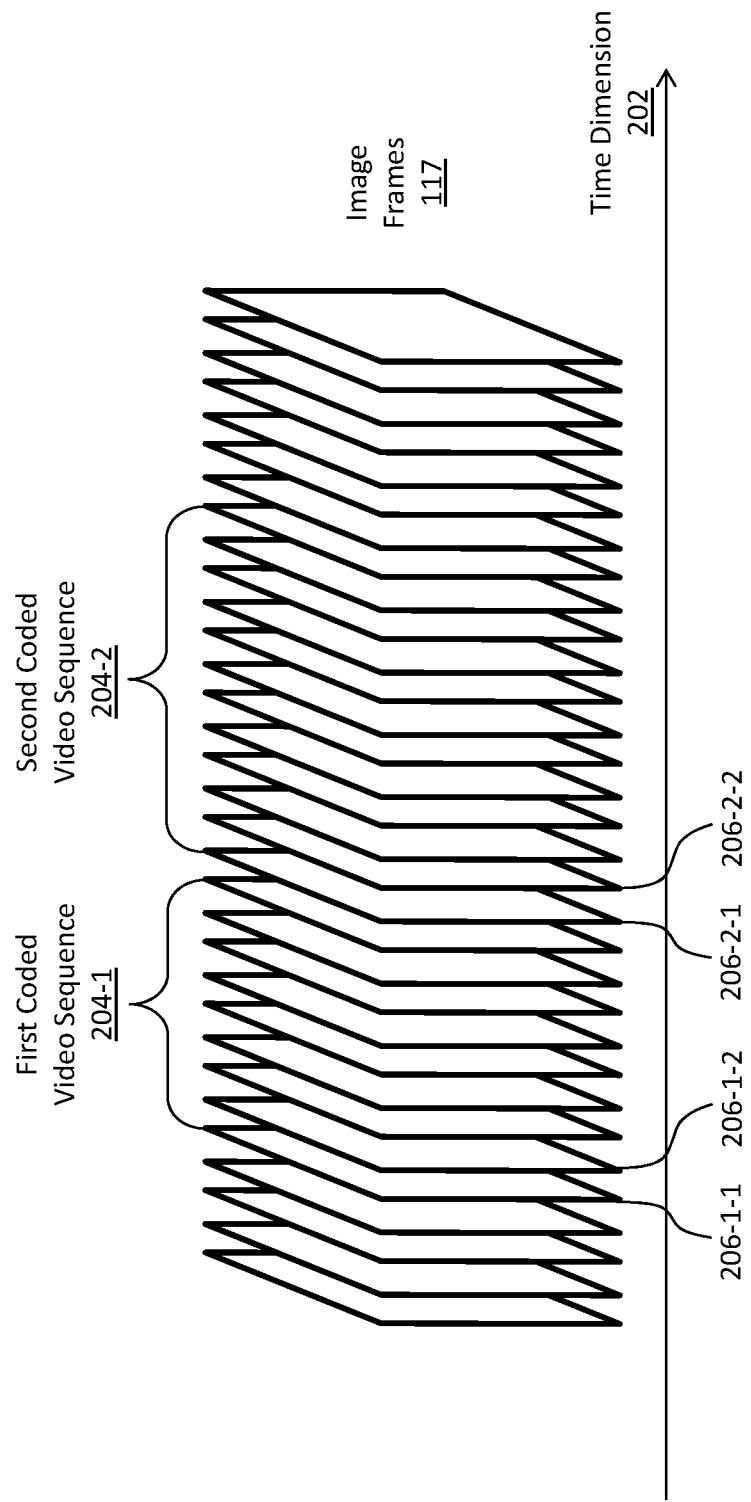
FIG. 2A illustrates example image frames.

FIG. 2A illustrates example image frames (e.g., 117 of FIG. 1, etc.) that comprises a sequence of consecutive image frames (e.g., 206-1-1, 206-1-2, 206-2-1, 206-2-2, others, etc.). The sequence of consecutive image frames may correspond to a sequence of consecutive time points spanning over a (e.g., normal playback, media playing, etc.) time dimension 202. Each image frame in the sequence of the image frames may correspond to a respective time point in the time dimension (202) in the sequence of consecutive time points and may be (designated) to be rendered by a display device for a respective frame interval at or around the respective time point.

As illustrated in FIG. 2A, the sequence of consecutive image frames may be partitioned into a plurality of coded video sequences such as a first coded video sequence 204-1, a second coded video sequence 204-2, and so forth. In some embodiments, any two of these coded video sequences are mutually exclusive (or non-overlapping). Each coded video sequence in the plurality of coded video sequences comprises a respective set of image frames. For example, the first coded video sequence (204-1) may comprise a first set of image frames 206-1-1, 206-1-2, etc. The second coded video sequence (204-2), which may be (e.g., immediately, etc.) subsequent to the first coded video sequence (204-1), may comprise a second set of image frames 206-2-1, 206-2-2, etc.

Figure 2B:
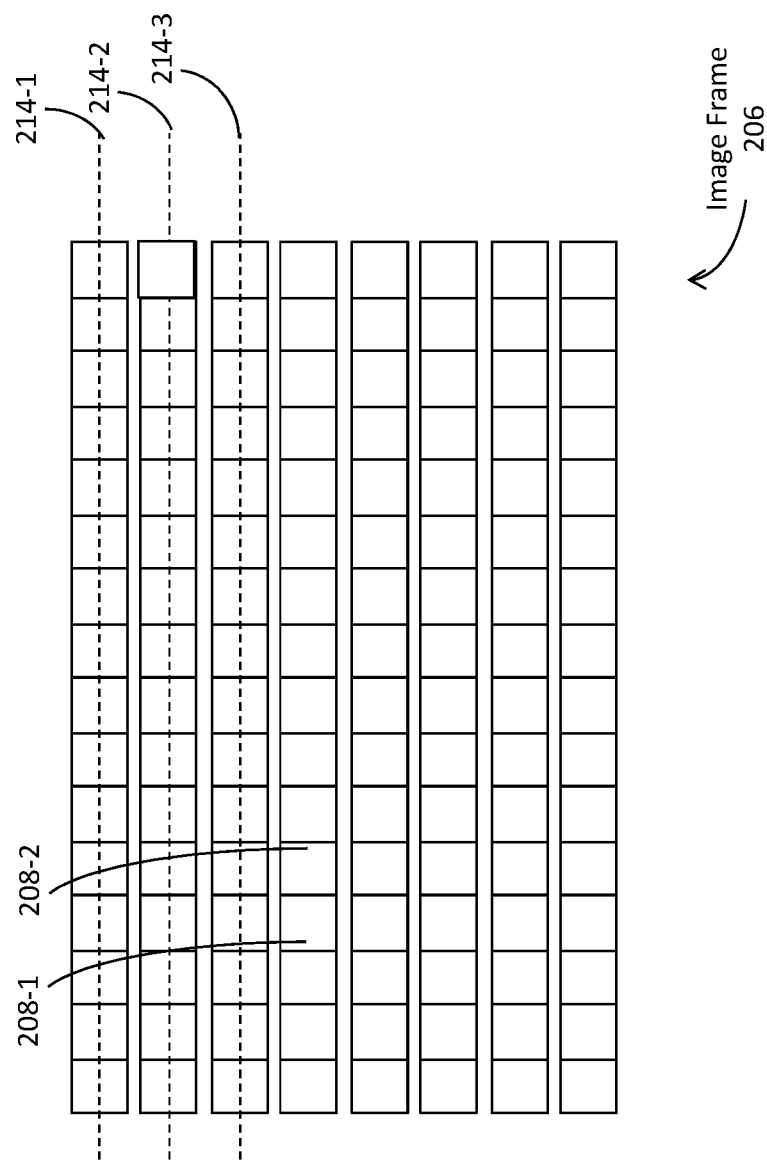
FIG. 2B illustrates an example image frame that comprises an array of pixels (or samples)

FIG. 2B illustrates an example image frame 206 that comprises an array of pixels (or samples) such as 208-1, 208-2, etc., at an array of pixel positions (or sample positions) that span over an (e.g., imaginary, physical, reference, etc.) image rendering surface. As illustrated, the array of pixels in the image frame (206) can be partitioned into a plurality of pixel rows (or sample rows) such as 214-1, 214-2, 214-3, etc. A pixel row may, but is not necessarily limited to only, correspond to a first spatial dimension (e.g., a horizontal dimension, etc.) of the image rendering surface. The plurality of pixel rows may be ordered with a row sequence index along a second different spatial dimension (e.g., a vertical dimension, etc.) of the image rendering surface.

It should be noted that an image frame as described herein may be represented in any of a wide variety of color spaces (e.g., YCbCr, RGB, IPT, ICpCt, a linear color space, a non-linear color space, a perceptual-quantization-based color space, etc.) and/or color formats (e.g., 4:4:4, 4:2:2, 4:2:0, etc.). Additionally, optionally or alternatively, the image frame may be represented in a different color space and/or a different color format through color space conversion operations, color format conversion operations, resampling operations, and so forth. Thus, an image frame as described herein may be (e.g., at least conceptually, etc.) represented by an array of luma samples in a monochrome format, or an array of luma samples and two corresponding chroma samples in a (e.g., 4:4:4, 4:2:2, 4:2:0, etc.) color format.

By way of illustration but not limitation, the image frame (206) as encoded into a image bitstream (e.g., 122 of FIG. 1, etc.) may comprise an array of RGB pixels each of which corresponds to a specific pixel position and comprises a red (R) subpixel, a green (G) subpixel, and a blue (B) subpixel.

In some embodiments, each image frame in a set (or plurality) of image frames in a coded video sequence is of an image frame type among a plurality of image frame types. Example image frame types as described herein may include, but are not necessarily limited to only, one or more of: a fully non-interleaved image frame type, a fully interleaved image frame type, a partly non-interleaved partly interleaved image frame type, etc.

If the image frame (206) is of a fully non-interleaved image frame type, then all pixel rows (or all pixels in all the pixel rows) in the image frame (206) are (designated) to be rendered concurrently in a single image field for a frame interval by a display device.

In operational scenarios in which raster scanning is used to render the image frame (206) as the single image field, pixel rows in the single image field are scanned for rendering in the same order as the row sequence indexes of the pixel rows. In these operational scenarios, the first pixel row (214-1) would be raster scanned first, followed by the second pixel row (214-2), further followed by the third pixel row (214-3), and so on.

If the image frame (206) is of a fully interleaved image frame type, then pixel rows in the image frame (206) are grouped or partitioned into two different image fields (top and bottom image fields). For example, the odd-numbered pixel rows may be partitioned or grouped into the top image field, whereas the even-numbered pixel rows are partitioned or grouped into the bottom image field. A frame interval is divided into two frame sub-intervals. All pixel rows in each of the top and bottom image fields is (designated) to be rendered concurrently for a respective frame sub-interval of the frame interval by a display device.

In operational scenarios in which raster scanning is used to render the image frame (206), pixel rows in each such image field of the image frame (206) can be scanned for rendering in the same order as the row sequence indexes of the pixel rows in that image field. In these operational scenarios, for a first frame sub-interval of the frame interval designated to render the top image field of the image frame (206), the first pixel row (214-1) in the top image field would be raster scanned first, followed by the third pixel row (214-3) in the top image field, and so on, with the even-numbered pixel rows such as the second pixel row (214-2) in the bottom image field omitted from being rendered for the first frame sub-interval. Conversely, for a second different frame sub-interval of the frame interval designated to render the bottom image field of the image frame (206), the second pixel row (214-2) in the bottom image field would be raster scanned first, followed by the next even-numbered pixel row (not shown) in the bottom image field, and so on, with the odd-numbered pixel rows such as the first pixel row (214-1) in the top image field omitted from being rendered for the second frame sub-interval.

Figure 2C:
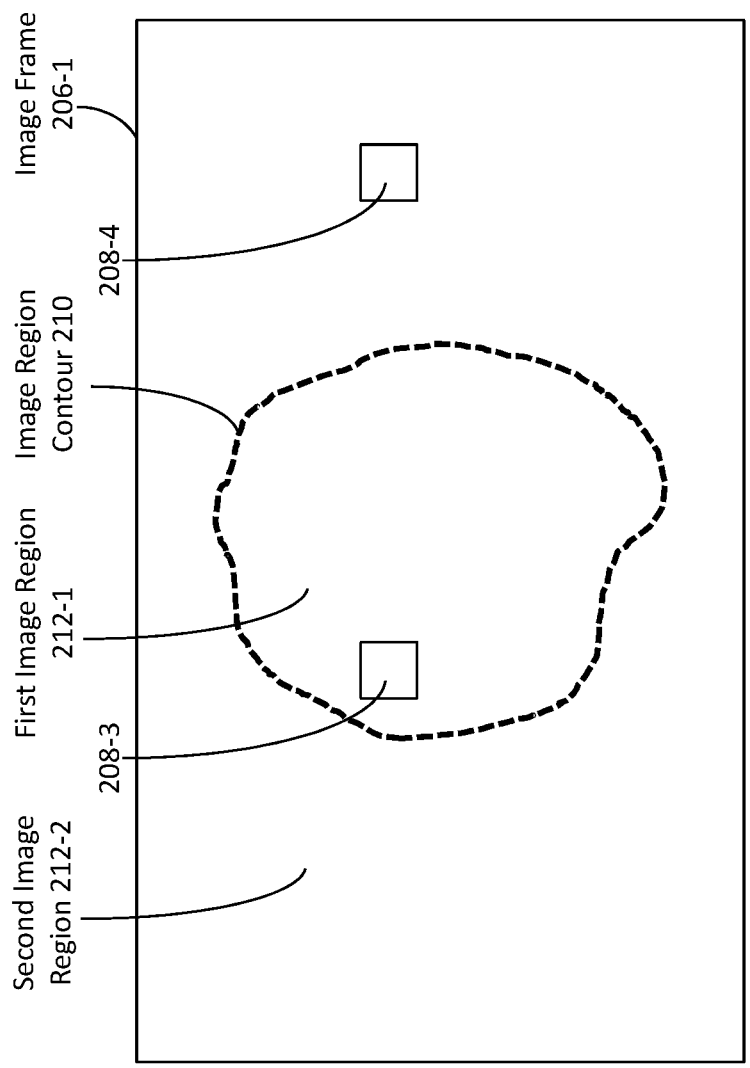
FIG. 2C illustrates an image frame of a partly non-interleaved partly interleaved image frame type.

FIG. 2C illustrates an image frame 206-1 that is of a partly non-interleaved partly interleaved image frame type. As illustrated, an image region contour 210 may be determined or delineated in the image frame (206-1), and may be used to partition the image frame (210) into different image regions such as a first image region 212-1 (e.g., enclosed by the image region contour (210), etc.) comprising pixels (e.g., 208-3, etc.), a second image region 212-2 (e.g., outside the image region contour (210), etc.) comprising pixels (e.g., 208-4, etc.), and so forth. In some embodiments, different interlacing patterns can be implemented in different image regions of the image frame (206-1).

In an example, (pixel rows or sample rows in) a first image field and a second image field may be interleaved in the first image region (212-1), whereas (pixel rows or sample rows in) a third image field alone may be used in the second image region (212-2). Pixels in the third image field that occupy the second image region (212-2) may be (designated) to be rendered for a frame interval in which the image frame (206-1) is (designated) to be rendered. Pixels in the first image field that occupy a part (e.g., odd-numbered rows) of the first image region (212-1) may be (designated) to be rendered for a first frame sub-interval of the frame interval. Pixels in the second image field that occupy a second part (e.g., even-numbered rows) of the first image region (212-1) may be (designated) to be rendered for a second frame sub-interval of the frame interval that follows the first frame sub-interval.

In another example, (pixel rows or sample rows in) a fourth image field and a fifth image field may be interleaved in the second image region (212-2), whereas (pixel rows or sample rows in) a sixth image field alone may be used in the first image region (212-1). Pixels in the sixth image field that occupy the first image region (212-1) may be (designated) to be rendered for a frame interval in which the image frame (206-1) is designated to be rendered. Pixels in the fourth image field that occupy a part (e.g., even-numbered rows) of the second image region (212-2) may be (designated) to be rendered for a first frame sub-interval of the frame interval. Pixels in the fifth image field that occupy a second part (e.g., odd-numbered rows) of the second image region (212-2) may be (designated) to be rendered for a second frame sub-interval of the frame interval that follows the first frame sub-interval.

As used herein, the image region contour (210) may be delineated based on image content (e.g., spatial distribution and statistics of values in pixels, etc.), using one or more of: object segmentation techniques, face/object detection, motion detection (e.g., different motion characteristics in different image regions, etc.), and so forth. Additionally, optionally or alternatively, manual input (e.g., from a colorist, a video professional, an operator of a media processing system, etc.) may be used to specify or determine an image region contour as described herein.

In some embodiments, one or more image regions in a partly interleaved partly non-interleaved image frame may be used to cover a central vision of a viewer, whereas one or more other image regions in the partly interleaved partly non-interleaved image frame may be used to cover a non-central vision of the viewer, for example in a video display application, an augmented reality (AR) video application, a virtual reality (VR) video application, a mixed reality (MR) video application, a game application, a remote presence application, and so forth.

In some embodiments, one or more image regions in a partly interleaved partly non-interleaved image frame may be used to depict fast-moving objects/figures, whereas one or more other image regions in the partly interleaved partly non-interleaved image frame may be used to cover other objects/figures/background in a video application including but not necessarily limited to movies, broadcasting, and so forth.

Figure 2D:
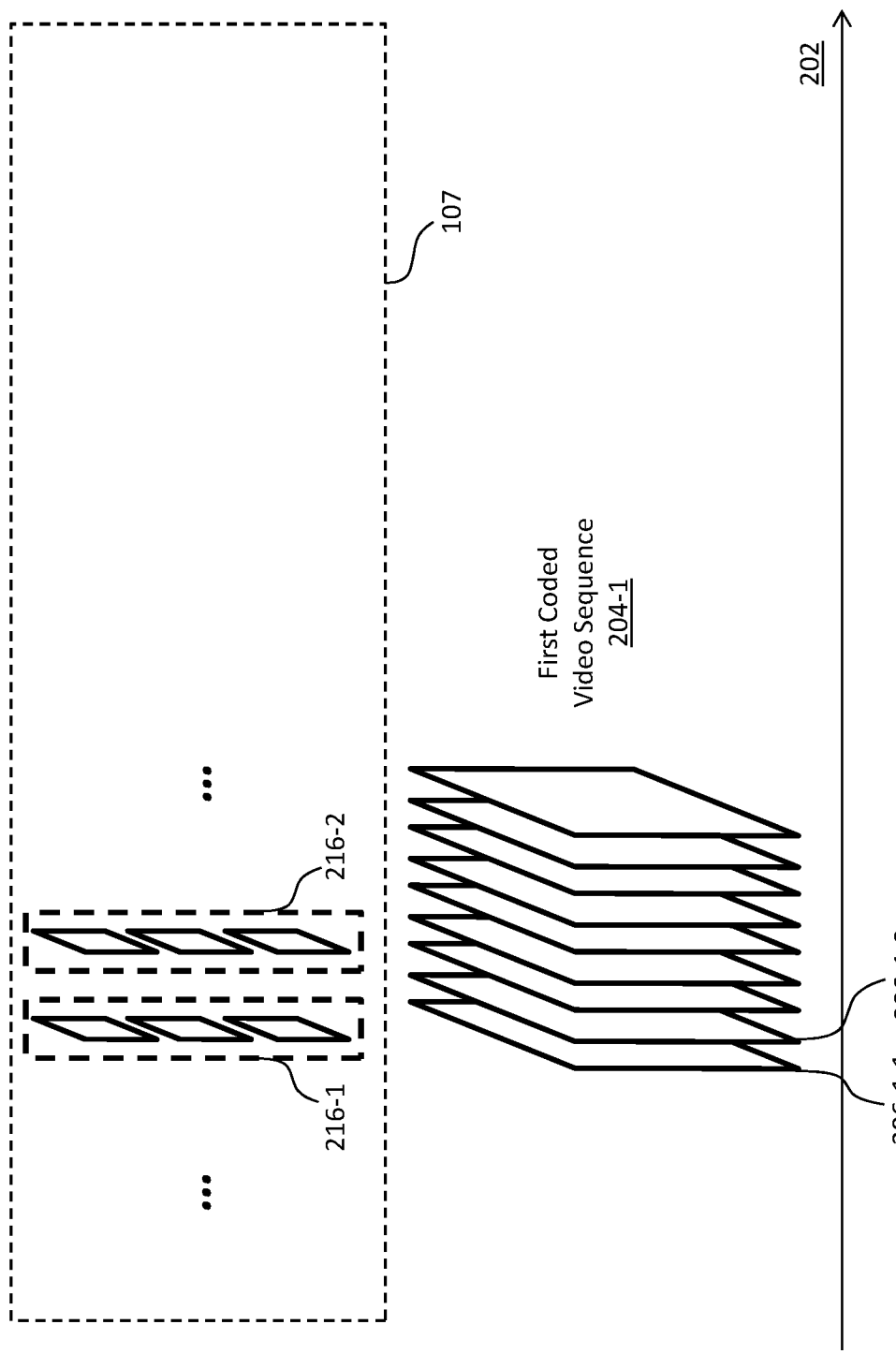
FIG. 2D and FIG. 2E illustrate example coded video sequences.

FIG. 2D illustrates an example coded video sequence (e.g., the first coded video sequence (204-1) of FIG. 2A, etc.) that comprises image frames of the same type. Image frames (e.g., 117 of FIG. 1, etc.) as described herein may be generated (e.g., created, edited, etc.) from input video data (e.g., 107 of FIG. 1, etc.) in a production phase (e.g., 110 of FIG. 1, etc.) and/or a post-production editing phase (e.g., 115 of FIG. 1, etc.). Each image frames in a set (or plurality) of image frames in the first coded video sequence (204-1) may be generated from some or all of one, two or more images in the input video data (107).

More specifically, a coded video sequence may comprise (e.g., may be encoded with, may be used to encode, etc.) image frames of a single image frame type. In an example, the coded video sequence may comprise image frames all of which are of the fully non-interleaved image frame type. In another example, the coded video sequence may comprise image frames all of which are of the fully interleaved image frame type. In yet another example, the coded video sequence may comprise image frames all of which are of the partly interleaved partly non-interleaved image frame type, as illustrated in FIG. 2C.

By way of illustration but not limitation, a first image frame 206-1-1 in the set of image frames in the first coded video sequence (204-1) may be generated from some or all of a first set 216-1 of source images in the input video data (107). A second image frame 206-1-2 in the set of image frames in the first coded video sequence (204-1) may be generated from some or all of a second set 216-2 of source images in the input video data (107).

Different image fields in an image frame in the first coded video sequence (204-1) may be generated respectively from different source images in the input video data (107). Additionally, optionally or alternatively, in some embodiments, at least two different image fields in an image frame in the first coded video sequence (204-1) may be generated (e.g., entirely, partly, etc.) from the same source image in the input video data (107).

Figure 2E:
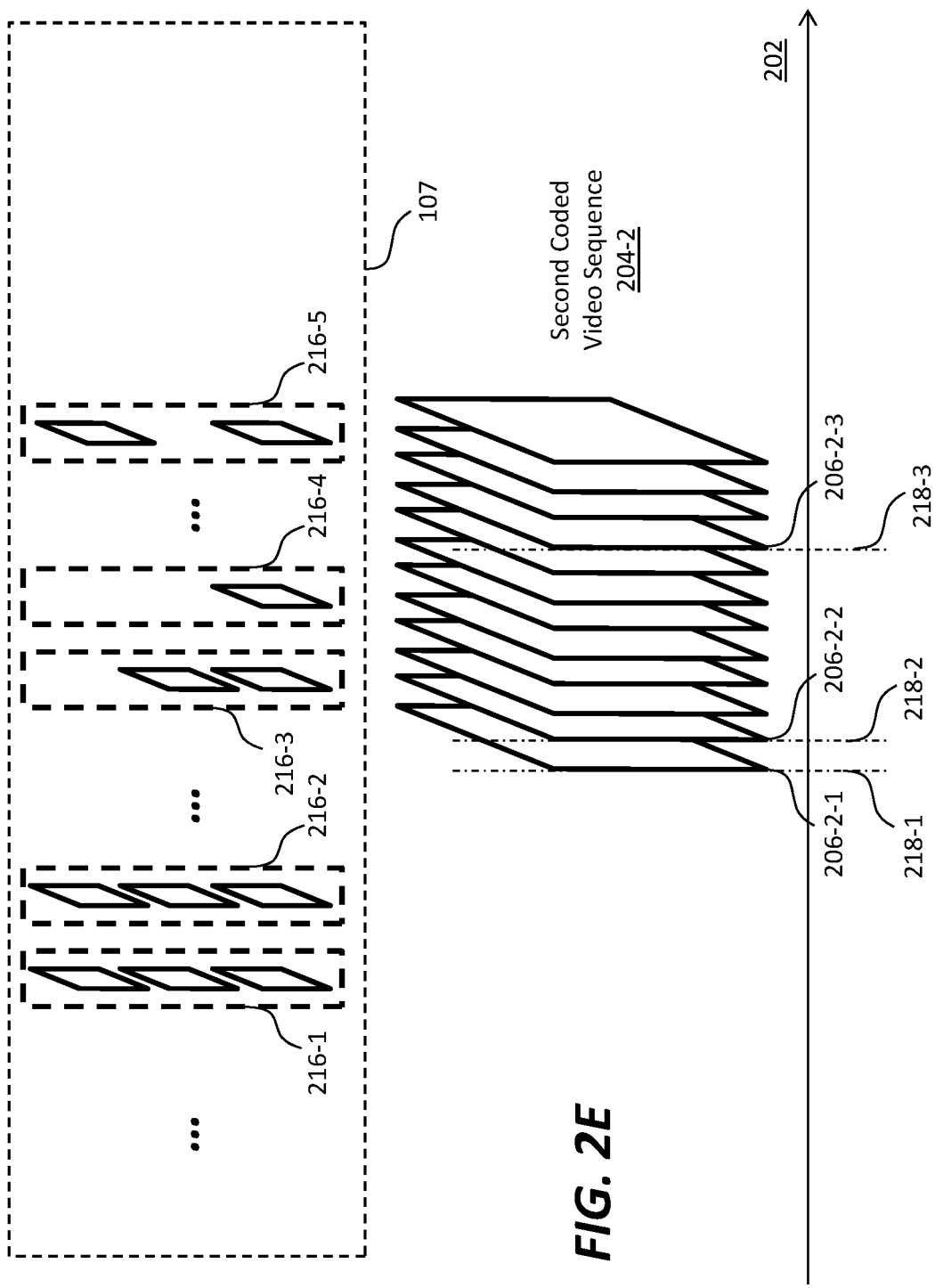

FIG. 2E illustrates an example coded video sequence (e.g., the second coded video sequence (204-2) of FIG. 2A, etc.) that comprises image frames of two or more different types.

More specifically, the second coded video sequence (204-2) may comprise image frames of two or more different image frame type in the plurality of image frame types. In an example, the coded video sequence may comprise image frames all of which are of either the fully non-interleaved image frame type or the fully interleaved image frame type. In another example, the coded video sequence may comprise image frames all of which are of either the fully non-interleaved image frame type or the partly interleaved partly non-interleaved image frame type. In yet another example, the coded video sequence may comprise image frames all of which are of either the fully interleaved image frame type or the fully interleaved image frame type. Additionally, optionally or alternatively, the coded video sequence may comprise image frames some of which are of the fully interleaved image frame type, some of which are of the fully non-interleaved image frame type, or some of which are of the partly interleaved partly non-interleaved image frame type.

By way of illustration but not limitation, a third image frame 206-2-1 in the set of image frames in the second coded video sequence (204-2) may be generated from some or all of a third set 216-3 of source images in the input video data (107). A fourth image frame 206-2-2 in the set of image frames in the second coded video sequence (204-2) may be generated from some or all of a fourth set 216-4 of source images in the input video data (107). A fifth image frame 206-2-3 in the set of image frames in the second coded video sequence (204-2) may be generated from some or all of a fifth set 216-5 of source images in the input video data (107).

As noted, an image frame (e.g., 206-1-1 of FIG. 2D, 206-1-2 of FIG. 2D, 206-2-1 of FIG. 2E, 206-2-2 of FIG. 2E, 206-2-3 of FIG. 2E, etc.) in image frames (e.g., 117 of FIG. 1, etc.) encoded in a image bitstream (e.g., 122 of FIG. 1, etc.) as described herein corresponds to a respective time point in a sequence of consecutive time points (in a time dimension such as 102 of FIG. 2A) to which the image frames (117 of FIG. 1) corresponds. As illustrated in FIG. 3C, the third image frame (206-2-1) may correspond to a first time point 218-1 in the time dimension (102), and may be (designated) for rendering in a first frame interval at or around the first time point (218-1). The fourth image frame (206-2-2) may correspond to a second time point 218-2, subsequent to the first time point (218-1), in the time dimension (102), and may be (designated) for rendering in a second frame interval at or around the second time point (218-2). The fifth image frame (206-2-3) may correspond to a third time point 218-3, subsequent to the second time point (218-2), in the time dimension (102), and may be (designated) for rendering in a third frame interval at or around the third time point (218-3).

Video Processing Relating to Content Light Levels

Figure 3A:
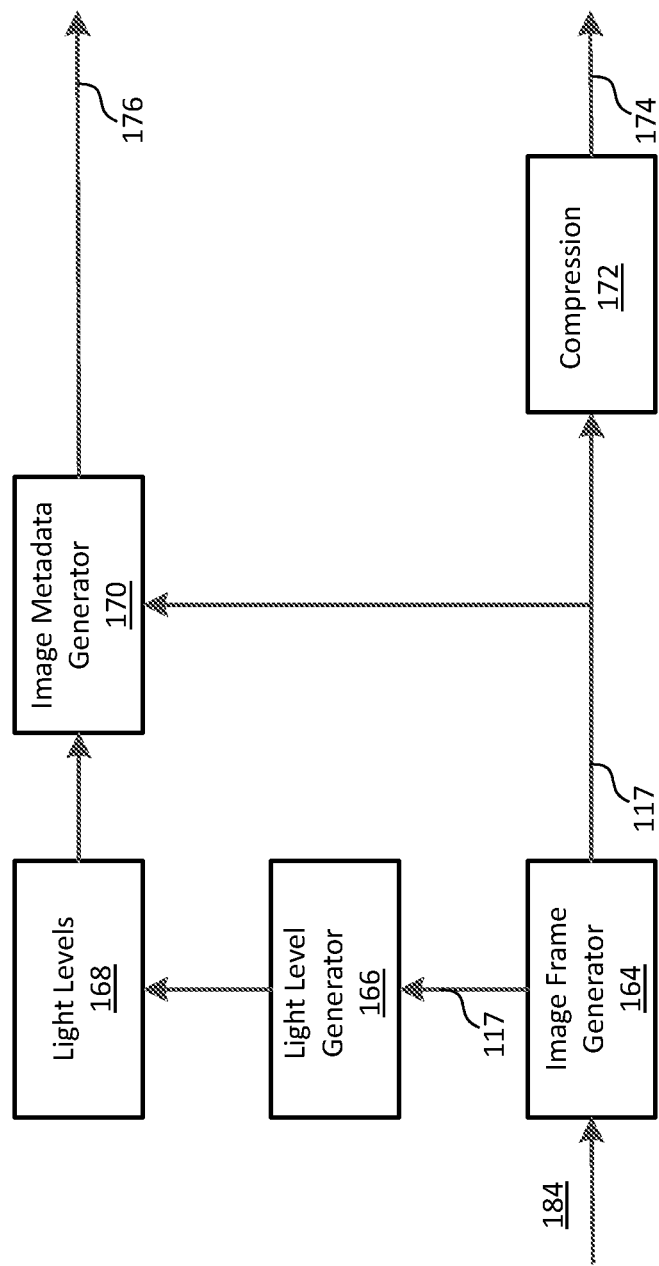
FIG. 3A illustrates an example video encoder for generating image frames and corresponding image metadata including but not limited to content light level metadata.

FIG. 3A illustrates an example video encoder for generating image frames (e.g., 117 of FIG. 1, etc.) and corresponding image metadata including but not limited to content light level metadata. Various system constituents may be implemented through software, hardware, or a combination of software and hardware. Any, some or all of these system constituents may be interconnected and communicated directly, or through one or more networks.

An image frame generator 164 receives source images 184 as input and uses the source images (184) to generate the image frames (117). In some embodiments, the source images (184) may be, but are not necessarily limited to only, any of: raw camera images, processed camera images, computer generated graphics, images generated through object-model-based image rendering, video frames (e.g., 102 of FIG. 1, etc.) digitally captured or computer generated, edited or color graded images (e.g., 112 of FIG. 1, etc.), and so forth.

Any combination of one or more image processing operations in a wide variety of image processing operations can be performed by the image frame generator (164) on the source images (184) for generating the image frames (117) that may be optimized for viewing on reference displays (e.g., 125 of FIG. 1, etc.). Example image processing operations that may be performed by the image frame generator (164) include, but are not necessarily limited to only, any of: decoding, encoding, transcoding, color space conversion, color format conversion, tone mapping, forward or backward reshaping, blending, mixing, cropping, color gamut transformation, inverse tone mapping, prediction, non-linear quantization, perceptual quantization, compression, decompression, spatial and/or temporal resampling such as downsampling or upsampling, deblocking, noise filtering, object segmentation, object/feature detection, operations based on image context and/or pixel values, and so forth.

A content light level generator 166 receives image frames (117) as input and generates content light levels 168 for the image frames (117).

In some embodiments, one, either or both of the image frame generator (164) and the content light level generator (166) can determine one or more per-frame content light levels for a given (e.g., each, specific, etc.) image frame in the image frames (117). Example per-frame content light levels computed from an image frame as described herein may include, but are not necessarily limited to only, any of: maximum content light level, average content light level, minimum content light level, etc., of some (e.g., a visually relevant region, a salient part, an image area that has been automatically or manually identified as more significant than other image areas, etc.) or all of the image frame.

In some embodiments, one, either or both of the image frame generator (164) and the content light level generator (166) can determine one or more per-CVS content light levels for a given (e.g., each, specific, etc.) coded video sequence in the image frames (117). In some embodiments, image frames in the coded video sequence may share common visual characteristics (e.g., dynamic range, color gamut, white point, motion characteristics, image features/objects, image texture, sharing the same instantaneous decoding refresh or IDR frame or access unit, etc.), and may be consecutive in the coded video sequence. Additionally, optionally or alternatively, the image frames in the coded video sequence may share the same level, layer, etc., in a prediction structure, a dependency structure, a layer structure, a quality level structure, a combination of the foregoing, etc. Example per-CVS content light levels computed from an image frame as described herein may include, but are not necessarily limited to only, any of: maximum content light level (MAXCLL), maximum frame-average content light level (MAXFALL), minimum content light level, etc.

In some embodiments, the per-CVS content light levels may be computed using some or all of per-frame content light levels computed for each image frame in a set (or plurality) of image frames that constitute the coded video sequence. By way of example but not limitation, a first per-CVS content light level such as MAXCLL for the coded video sequence may be computed as the maximum of per-frame maximum content light levels of some or all of the image frames in the coded video sequence. A second per-CVS content light level such as MAXFALL for the coded video sequence may be computed as the maximum of per-frame average content light levels of some or all of the image frames in the coded video sequence.

In some embodiments, one, either or both of the image frame generator (164) and the content light level generator (166) can determine one or more per-subdivision-of-CVS content light levels for a subdivision of a given (e.g., each, specific, etc.) coded video sequence in the image frames (117). As used herein, a subdivision of the coded video sequence may refer to a proper subset of image frames in a plurality of proper subsets of image frames, a group of pictures or a GOP in a plurality of GOPs, etc., of the coded video sequence. In some embodiments, image frames in a subdivision of the coded video sequence may share common visual characteristics (e.g., dynamic range, color gamut, white point, motion characteristics, image features/objects, image texture, etc.), and may be consecutive in the coded video sequence. Additionally, optionally or alternatively, the image frames in the subdivision of the coded video sequence may share the same level, layer, etc., in a prediction structure, a dependency structure, a layer structure, a quality level structure, a combination of the foregoing, etc. Example per-subdivision-of-CVS content light levels computed from an image frame as described herein may include, but are not necessarily limited to only, any of: maximum content light level (MAXCLL), maximum frame-average content light level (MAXFALL), minimum content light level, etc.

In some embodiments, the per-subdivision-of-CVS content light levels may be computed using some or all of per-frame content light levels computed for each image frame in the proper set (or plurality) of image frames that constitute the subdivision of the coded video sequence. By way of example but not limitation, a first per-subdivision-of-CVS content light level such as MAXCLL for the subdivision of the coded video sequence may be computed as the maximum of per-frame maximum content light levels of some or all of the proper subset of image frames in the subdivision of the coded video sequence. A second per-subdivision-of-CVS content light level such as MAXFALL for the subdivision of the coded video sequence may be computed as the maximum of per-frame average content light levels of some or all of the proper subset of image frames in the subdivision of the coded video sequence.

A content light level (e.g., per-frame content light levels, per-subdivision-of-CVS content light levels, per-CVS content light levels, per-media-program content light levels computed further from some or all of the foregoing, etc.) as described herein may be, without limitation, represented as a linear value (e.g., linearly proportional to or linearly convertible to a physical light intensity level expressed in nits, etc.), or as a non-linear value (e.g., nonlinearly convertible to a physical light intensity level expressed in nits, etc.). In some embodiments, luma codewords (e.g., I values in IPT or ICtCp color space, Y in YCbCr color space, etc.), chroma codewords (e.g., P and T values in IPT, Ct and Cp values in ICtCp color space, Cb and Cr values in YCbCr color space, etc.), color component codewords (e.g., R, G and B values in a RGB space, etc.), represented in pixels of an image frame may or may not be a linear value. In various embodiments, regardless of whether the content light levels are generated as linear or non-linear values, the codewords represented in the pixels of the image frame may be generated based on one or more of: nonlinear non-perceptual-quantization-codeword mapping functions (e.g., non-linear-non-PQ electro-optical transfer function or EOTFs, etc.) such as those related to gamma coding or hybrid log gamma (HLG) coding, nonlinear PQ codeword mapping functions (e.g., non-linear-PQ EOTF, etc.), linear mapping functions (e.g., based on exposure settings, etc.), and so forth.

In some embodiments, an image metadata generator 170 (e.g., a part of the coding block (120), etc.) receives the image frames (117) and the content light levels (168) as input, generates image metadata 176 such as global dimming metadata, local dimming metadata, DM metadata, and so forth. Some or all of the per-frame, per-subdivision-of-CVS, per-CVS, etc., content light levels as described herein may be included in the content light levels (168). In an example, only per-CVS content light levels are transmitted to downstream device in the image metadata (176). In another example, any combination of the per-frame, per-subdivision-of-CVS, per-CVS, etc., content light levels as described herein may be transmitted in the image metadata (176).

As illustrated in FIG. 3A, a compression block 142 (e.g., a part of the coding block (122) of FIG. 1, etc.) compresses/encodes the image frames (117) in a video signal 174. An example video signal may be, but is not necessarily limited to only, the image bitstream (122) of FIG. 1. The image metadata (176), as generated by the image metadata generator (170) based on the image frames (117), the content light levels (168), etc., may be encoded (e.g., by the coding block (122) of FIG. 1, etc.) into the video signal.

The image metadata (176) may be carried in-band or embedded with the compressed image frames (117) in the video signal, or (additionally, optionally or alternatively) separately carried in the video signal (e.g., in a separate metadata container, in a separate bitstream, in a designated sub-stream, in a component stream, etc.) from the image frames. For example, the image metadata (176) may be encoded in a component stream in the image bitstream, which component stream may or may not be separate from other component stream(s) (of the image bitstream) in which the image frames (117) are encoded.

The image metadata (176) can be used to avoid directly encoding different target-device-specific images for different target displays that may or may not have the same display capabilities as the reference display (125). Instead, the image metadata (176) in the video signal can be used to enable downstream decoding devices operating with different target displays to perform image processing/rendering operations that can optimize decoded images (e.g., 182 of FIG. 1) to generate display images respectively optimized for each of these target displays and render the optimized display images with image content represented in the image frames (117) on these different target displays, regardless of whether the target displays have the same display capabilities as the reference display (125) for which the image frames (117) are optimized.

In some embodiments, some or all of the content light level metadata may be coded into one or more supplemental enhancement information (SEI) messages that are transmitted in the video signal (174) with the image frames (117). An example syntax used to code a content light level information SEI message as described herein is illustrated in TABLE 1 below. It should be noted that, in various embodiments, another syntax with more or fewer syntax elements as illustrated in TABLE 1 may be used to code content light level information in an SEI message.

TABLE 1

|  | Descriptor |
|---|---|
| content_light_level_info(payloadSize) { |  |
|   max_content_light_level | u(16) |
|   max_content_light_level_interpretation | u(1) |
|   max_content_light_level_type | u(3) |
|   max_content_light_level_io_type | u(3) |
|   max_frame_average_light_level | u(16) |
|   max_frame_average_light_level_interpretation | u(1) |
|   max_frame_average_light_level_type | u(3) |
|   max_frame_average_light_level_io_type | u(3) |
| } |  |

This SEI message syntax identifies upper bounds for the nominal target brightness light level of any, some or all of the frames of the coded video sequence. For example, an SEI message coded in the syntax as illustrated in TABLE 1 may be used to identify upper bounds for the nominal target brightness light level of one or more individual frames in the coded video sequence, one or more individual subdivisions of the coded video sequence, the entire coded video sequence, one or more coded video sequence, an input video signal/source, a media program (e.g., live broadcast, a TV program, etc.), and so forth.

In a non-limiting example embodiment, the information conveyed in the SEI message is intended to be adequate for purposes corresponding to the use of a proprietary and/or industry standard in connection with video coding and/or displaying such as related to the Consumer Technology Association 861.3-A specification, H.264, AVC, H.265, HEVC, and so forth. By way of illustration but not limitation, in some embodiments, the video signal (174) represents a image bitstream encoded in an H.264 (like) coding syntax.

The semantics of the content light level information SEI message can be defined in relation to the values of samples (or pixels) in a 4:4:4 representation of red, green, and blue color primary intensities in the linear light domain for the frames of the coded video sequence, in units of candelas per square meter (or nits). However, this SEI message does not, by itself, identify a conversion process for converting the sample values (or pixel values) of a decoded image frame to the sample values of an RGB frame in a 4:4:4 representation of red, green, and blue color primary intensities in the linear light domain that corresponds to the decoded image frame.

In operational scenarios in which the video signal (174) represents a image bitstream encoded in an H.264 coding syntax, other syntax elements in the H.264 coding syntax, such as "colour_primaries", "transfer_characteristics", "matrix_coeffs", and the chroma resampling filter hint SEI message, when present, may assist in the identification of such a conversion process.

In operational scenarios in which the video signal (174) represents a image bitstream encoded in an H.264 coding syntax, other syntax elements in the H.264 coding syntax, a video encoder as described herein, such as illustrated in FIG. 3A, may implement a number of constraints that apply for the presence of content light level information SEI messages in IDR access units (e.g., a coding unit or syntax element— in a coded video sequence of the video signal (174)—for encoding an image frame as described herein, etc.).

Under a first constraint, when a content light level information SEI message is present in any access unit of a coded video sequence and the content light level information SEI message is not contained within any other SEI message, a content light level information SEI message that is not contained within any other SEI message shall be present in the IDR access unit that is the first access unit of the coded video sequence.

Under a second constraint, when a content light level information SEI message is present in any access unit of a coded video sequence and the content light level information SEI message is contained in a scalable nesting SEI message applying to dependency_id (dId), quality_id (qId), and temporal_id (tId), a content light level information SEI message that is contained in a scalable nesting SEI message applying to dependency_id equal to dId, quality_id equal to qId, and temporal_id equal to tId shall be present in the IDR access unit that is the first access unit of the coded video sequence.

Under a third constraint, when a content light level information SEI message is present in any access unit of a coded video sequence and the content light level information SEI message is contained in an MVC scalable nesting SEI message applying to view_id (vId) and temporal_id (tId), a content light level information SEI message that is contained in an MVC scalable nesting SEI message applying to view_id equal to vId and temporal_id equal to tId shall be present in the IDR access unit that is the first access unit of the coded video sequence.

Under a fourth constraint, when a content light level information SEI message is present in any access unit of a coded video sequence and the content light level information SEI message is contained in an MVCD scalable nesting SEI message applying to texture views with view_id (vId) and temporal_id (tId), a content light level information SEI message that is contained in an MVCD scalable nesting SEI message applying to texture views with view_id equal to vId and temporal_id equal to tId shall be present in the IDR access unit that is the first access unit of the coded video sequence.

In some embodiments, the content light level information SEI message persists in decoding order from the current access unit until the end of the coded video sequence.

In some embodiments, when a content light level information SEI message is not contained within any other SEI message, it pertains only to VCL NAL units with nal_unit_type in the range of 1 to 5, inclusive.

Examples of SEI messages, scalable nesting SEI messages, MVC scalable nesting SEI messages, MVCD scalable nesting SEI messages, coded video sequences, access units, IDR access units, dependency_id (dId), quality_id (qId), temporal_id (tId), view_id (vId), texture views, decoding order, NAL units, VCL NAL units, nal_unit_type, and so forth, can be found in ITU-T H.264 "Advanced video coding for generic audiovisual services" (April 2017), which is incorporated herein by reference in its entirety.

In some embodiments, when the bitstream is a scalable video bitstream (e.g., according to Annex G of the H.264 standard, etc.), a content light level information SEI message that is not contained within any other SEI message applies only to the base layer bitstream. When the bitstream is a multiview video bitstream (e.g., according to Annex H of the H.264 standard, etc.), a content light level information SEI message that is not contained within any other SEI message applies only to the base layer bitstream. When the bitstream is a multiview video bitstream with depth (e.g., according to Annex I or J of the H.264 standard, etc.), a content light level information SEI message that is not contained within any other SEI message applies only to the base texture view.

In operational scenarios in which the video signal (174) represents a image bitstream encoded in an H.264 coding syntax, other syntax elements in the H.264 coding syntax, a video encoder as described herein, such as illustrated in FIG. 3A, may implement a number of further constraints that apply for the content of content light level information SEI messages.

Under the first further constraint, all content light level information SEI messages that apply to the same coded video sequence and are not contained within any other SEI message shall have the same content.

Under the second further constraint, all content light level information SEI messages that apply to the same coded video sequence and are contained in a scalable nesting SEI message applying to particular values of dependency_id, quality_id, and temporal_id shall have the same content.

Under the third further constraint, all content light level information SEI messages that apply to the same coded video sequence and are contained in an MVC scalable nesting SEI message applying to particular values of view_id and temporal_id shall have the same content.

Under the fourth further constraint, all content light level information SEI messages that apply to the same coded video sequence and are contained in an MVCD scalable nesting SEI message applying to texture views with particular values of view_id and temporal_id shall have the same content.

In some embodiments, some or all of the foregoing constraints may be relaxed (or not implemented), for example for the purpose of signaling content light levels pertaining to individual frames or individual subdivisions of a coded video sequence.

In some embodiments, "max_content_light_level" in a content light level SEI message as described herein, when not equal to 0, indicates an upper bound on the maximum light level among all individual samples (or pixels) in a 4:4:4 representation of red, green, and blue color primary intensities (in the linear light domain) for the frames of the coded video sequence, in units of candelas per square meter. When equal to 0, no such upper bound is indicated by "max_content_light_level".

In some embodiments, "max_content_light_level_interpretation" in a content light level SEI message as described herein, when equal to 0 or not present, indicates "max_content_light_level" is interpreted as MaxCLL in accordance with a video coding standard such as CTA-861.3-A. When present and not equal to 0, indicates "max_content_light_level" is interpreted by some other means including but not limited to those not specified in the video coding standard. In some embodiments, the syntax element "max_content_light_level_interpretation" can be specified or added in alignment with MovieLabs Common Metadata 'md' namespace (TR-META-CM, version 2.6, Dec. 11, 2017). Additionally, optionally or alternatively, the methods for calculating "max_content_light_level_interpretation" can be the same as or similar to those methods specified in a specific video coding standard such as one of: TR-META-CM, CTA-861.3. and so forth.

In some embodiments, "max_content_light_level_type" in a content light level SEI message as described herein, indicates the scan type used to calculate the value of "max_content_light_level". Example values of "max_content_light_level_type" may be represented as values of "Scan type" illustrated in TABLE 2 below.

TABLE 2

| Value | Scan type |
|---|---|
| 0 | progressive frame |
| 1 | complementary field pair |
| 2 | MBAFF frame |
| 3 | individual field picture |
| 4 | Unknown |
| 5 . . . 7 | Reserved |

The fields "max_content_light_level_type" and "max_frame_average_light_level_type" can be used to make it clear, respectively, if the values of "max_content_light_level" and "max_frame_average_light_level" were calculated at the frame-level (which could be progressive frames, complementary filed pairs, or MBAFF frames) or individual fields. For example, content light level values would be different if two fields in an image frame were averaged together rather than separately, particularly for flashes of light, cross fades, and dissolves in interlaced source content. The fields "max_content_light_level_type" and "max_frame_average_light_level_type" can be used to signal definitely how "max_content_light_level" and "max_frame_average_light_level" are computed, without attempting to deduce possibly from other fields such as the "ct_type" syntaxt element which is present only if clock_timestamp_flag of the picture timing SEI message is set, as a image bitstream (e.g., an H.264 image bitstream, etc.) may not carry an indicator of input scan type such as "ct_type" in some operational scenarios. Moreover, in these operational scenarios, the image bitstream may not carry an indicator of display scan type other than the optional "pic_struct" syntax element of the picture timing SEI message. Thus, these fields such as "ct_type" (input scan type indicator) and "pic_struct" (output scan type indicator) cannot be extended to indicate whether "max_content_light_level" is applied to the input source or the output coded video sequence.

In some embodiments, "max_content_light_level_io_type" in a content light level SEI message as described herein, indicates whether the value of "max_content_light_level" applies to an input video signal/source, an entire coded video sequence, or one or more other signal portions/segments. Example values of "max_content_light_level_io_type" may be represented as values of "Input-output type" illustrated in TABLE 3 below.

TABLE 3

| Value | Input-output type |
|---|---|
| 0 | input source |
| 1 | entire coded video sequence |
| 2 | live encoding |
| 3 | Unknown |
| 4 . . . 7 | Reserved |

In TABLE 3 above, a value of 0 may be used to indicate that the content light level values such as "max_content_light level" and "max_frame_average_light_level" are passed-through from source video. A value of 1 may be used to indicate that content light level values are calculated post-compression and inserted into the bitstream, for example to assist in file-based encoding. A value of 2 may be used to indicate upper-bound content light level values to assist in live encoding.

The fields "max_content_light_level_io_type" and "max_frame_average_light_level_io_type" can be used to make it clear if the values "max_content_light_level" and "max_frame_average_light_level" apply to input source content or to values calculated after encoding an entire video sequence, as could be the case for file-based encoding and video-on-demand (e.g., Netflix, Roku, Sling, etc.). Adding these 2 syntax elements also enables a H.264 based image bitstream to signal live encoding and transcoding, even in operational scenarios in which program-level static metadata may be difficult to generate for content light levels such as in live broadcasts. Signaling live encoding provides useful guidance information that would otherwise be unavailable to display adaptation systems, display management systems, global/local dimming systems, display power management systems, and so forth.

In some embodiments, "max_frame_average_light_level" in a content light level SEI message as described herein, when not equal to 0, indicates an upper bound on the maximum average light level among the samples (or pixels) in a 4:4:4 representation of red, green, and blue color primary intensities (in the linear light domain) for any individual frame of the coded video sequence, in units of candelas per square metre. When equal to 0, no such upper bound is indicated by "max_frame_average_light_level".

In some embodiments, "max_frame_average_light_level_interpretation" in a content light level SEI message as described herein, when equal to 0 or not present, indicates "max_frame_average_light_level_interpretation" is interpreted as MaxFALL in accordance with a video coding standard such as CTA-861.3-A. When present and not equal to 0, indicates "max_frame_average_light_level" is interpreted by some other means including but not limited to those not specified in the video coding standard. In some embodiments, the syntax element "max_frame_average_light_level_interpretation" can be specified or added in alignment with MovieLabs Common Metadata 'md' namespace (TR-META-CM, version 2.6, Dec. 11, 2017). Additionally, optionally or alternatively, the methods for calculating "max_frame_average_light_level_interpretation" can be the same as or similar to those methods specified in a specific video coding standard such as one of: TR-META-CM, CTA-861.3. and so forth.

In some embodiments, "max_frame_average_light_level_type" in a content light level SEI message as described herein, indicates the scan type used to calculate the value of "max_frame_average_light_level as". Example values of "max_frame_average_light_level_type" may be represented as values of "Scan type" illustrated in TABLE 2 above.

In some embodiments, "max_frame_average_light_level_io_type" in a content light level SEI message as described herein, indicates whether the value of "max_frame_average_light_level" applies to an input video signal/source, an entire coded video sequence, live encoding, or one or more other signal portions/segments. Example values of "max_frame_average_light_level_io_type" may be represented as values of "Input-output type" illustrated in TABLE 3 above.

In some embodiments, when the visually relevant region does not correspond to the entire cropped decoded picture, such as for "letterbox" encoding of video content with a wide picture aspect ratio within a taller cropped decoded picture, the indicated frame average may be performed only within the visually relevant region.

Figure 3B:
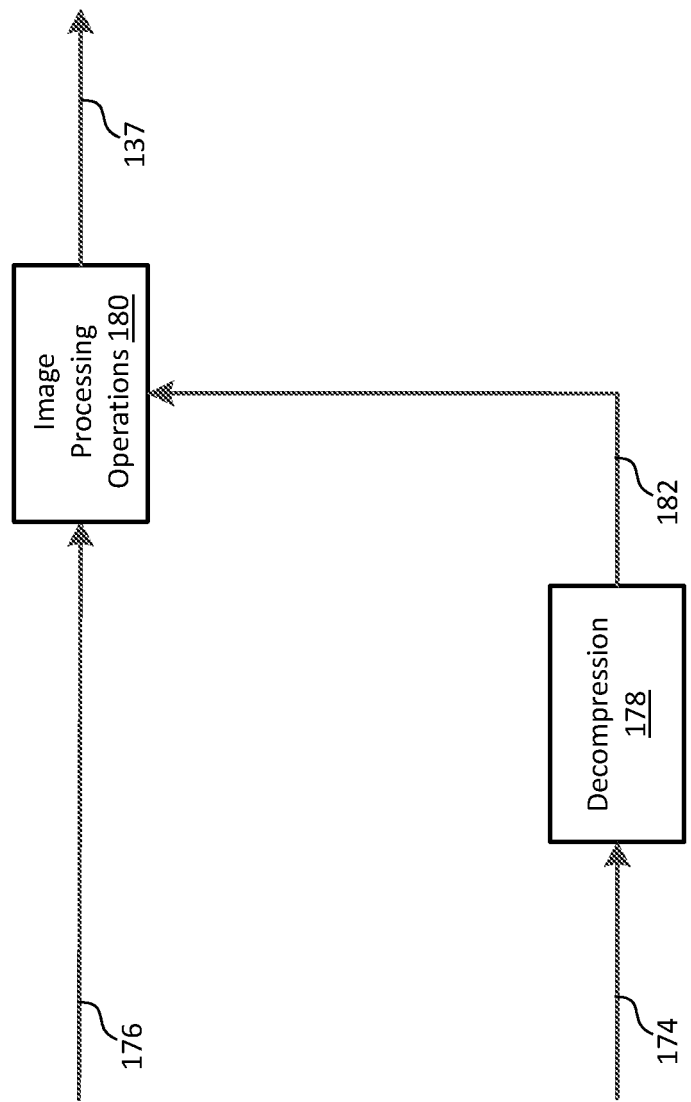
FIG. 3B illustrates an example video decoder for decoding image frames and corresponding image metadata including but not limited to content light level metadata.

FIG. 3B illustrates an example video decoder (e.g., decoding block (130) of FIG. 1, etc.) for processing a video signal 174 that carries image frames (e.g., 182, etc.) and corresponding image metadata (e.g., 176, etc.) including but not limited to content light level metadata. The image frames (182) are received and decoded from the video signal by a decompression block 178, and are the same as the image frames (117) of FIG. 1 or FIG. 3A subject to possible coding errors and/or quantization errors. The image metadata (176) is also encoded and transmitted in the video signal with the image frames (182) so that specific display devices can use the image metadata (176) to perform device-common and/or device-specific image processing operations 180 on the image frames (182) to generate device-specific display images (e.g., 137, etc.) respectively optimized for the specific display devices.

The optimized device-specific display images (137) may be outputted over an HDMI interface, over a video link, etc., to and rendered on a target display device.

Image metadata such as content light level information in a video signal (or a image bitstream) as described herein can be used by a recipient device to cause a number of image processing operations to be performed on image frames decoded from the video signal.

In an example, MAXFALL may be used by the recipient device to perform global dimming operations and/or local dimming operations and/or display management (DM) operations to preserve image details (e.g., contrasts, colors, etc.) in salient image portions (e.g., mid-tone, etc.) while remapping or scaling down the light levels in the image frames below a maximum frame-average power consumption threshold supported by a display device. For certain display devices with higher transient backlight generation capabilities, MAXFALL for a coded video sequence or an image portion in a video signal can be used to estimate or determine whether some or all of these image frames with relatively high MAXFALL can still be displayed or rendered without remapping or scaling down the light levels in the image frames by temporarily exceeding the maximum frame-average power consumption threshold.

In another example, MAXCLL may be used by the recipient device to perform global dimming operations and/or local dimming operations and/or display management (DM) operations to preserve image details (e.g., contrasts, colors, etc.) in salient image portions (e.g., mid-tone, etc.) while remapping or scaling down the light levels in the image frames below a maximum peak luminance threshold supported by a display device. For certain display devices with higher transient local peak backlight generation capabilities, MAXCLL for a coded video sequence or an image portion in a video signal can be used to estimate or determine whether some or all of these image frames with relatively high MAXCLL can still be displayed or rendered without remapping or scaling down the light levels in the image frames.

Example Process Flows

FIG. 4A illustrates an example process flow according to an embodiment of the present invention. In some embodiments, one or more computing devices or components (e.g., an upstream encoder, an encoding device/module, a transcoding device/module, a decoding device/module, an inverse tone mapping device/module, a tone mapping device/module, a media device/module, etc.) may perform this process flow.

In block 402, an image processing device (e.g., coding block (120), etc.) determines, for a specific image frame (e.g., 206-1-1, 206-1-2, 206-2-1, 206-2-2, and so forth, of FIG. 2A, FIG. 2D or FIG. 2E, etc.) in which pixels (or output samples; e.g., 208-3, 208-4, etc., of FIG. 2C, etc.) are to be generated from source pixels (or input samples) in a set of images (e.g., 216-1, 216-2, 216-3, 216-4, 216-5, and so forth, of FIG. 2D or FIG. 2E, etc.), a first image frame portion (e.g., the first image region (212-1) of FIG. 2C, etc.) in the specific image frame and a second image frame portion (e.g., the second image region (212-2) of FIG. 2C, etc.) in the specific image frame. The specific image frame may correspond to a respective time point in a plurality of consecutive time points in a (e.g., media playing, etc.) time dimension (e.g., 202 of FIG. 2A, FIG. 2D or FIG. 2E, etc.), and may be (designated) to be rendered for a frame interval by a display device. The frame interval for which the specific image frame may be (designated) to be rendered is associated with (e.g., at, around, etc.) the respective time point.

In block 404, the image processing device generates, respectively from a first image and a second image in the set of source images, a first image field and a second image field that are to be interleaved into the first image frame portion in the specific image frame. The first image field or pixels therein may be (designated) to be rendered for a first frame sub-interval of the frame interval. The second image field or pixels therein may be (designated) to be rendered for a second frame sub-interval of the frame interval. In some embodiments, the second frame sub-interval of the frame interval may be at least partly non-overlapping with, and may be (designated) to be immediately follow, the first frame sub-interval of the frame interval.

In block 406, the image processing device generates, from a third image in the set of source images, a third image field used to occupy all pixel positions (or sample positions) in the second image frame portion in the specific image frame, for example without interlacing multiple image fields.

In block 408, based at least in part on pixels (or output samples) of the first image field, the second image field and the third image field in the specific image frame, the image processing device generates one or more content light levels for a coded video sequence (e.g., 204-1 of FIG. 2A or FIG. 2D, 204-2 of FIG. 2A or FIG. 2E, etc.) to be encoded with a plurality of image frames including the specific image frame.

In block 410, the image processing device transmits the coded video sequence, along with image metadata that includes the one or more content light levels, in a image bitstream (e.g., 122 of FIG. 1, etc.).

In an embodiment, the first image frame portion and the second image frame portion are delineated in the specific image frame based on image content represented by the source pixels in the set of source images.

In an embodiment, the first image frame portion and the second image frame portion are delineated in the specific image frame based on visual characteristic differences in image content in the first image frame portion and the second image frame portion.

In an embodiment, the one or more content light levels comprise at least one of: a maximum frame-average content light level among the plurality of image frames, or a maximum content light level among the plurality of image frames.

In an embodiment, the one or more content light levels are carried in the image bitstream with one or more associated fields; the one or more associated fields includes one or more of: an interpretation for the maximum content light level, a type for the maximum content light level, an input/output type for the maximum content light level, an interpretation for the maximum frame average light level, a type for the maximum frame average light level, an input/output type for the maximum frame average light level, etc.

In an embodiment, the first image frame portion and the second image frame portion are non-overlapping in the specific image frame.

In an embodiment, the image bitstream represents a H.264 video signal.

In an embodiment, the image frame is representable with an array of luma samples for monochrome video content.

In an embodiment, the image frame is representable with an array of luma samples and two corresponding arrays of chroma samples in a color format for polychrome video content.

In an embodiment, the first image frame portion and the second image frame portion collectively represent a visually relevant region in image content represented in the specific image frame.

In an embodiment, the specific image frame is of a partly interleaved partly non-interleaved image frame type; the coded video sequence comprises a second specific image frame that is of one of: a fully interleaved image frame type, a fully non-interleaved image frame type, and so forth.

In an embodiment, the coded video sequence comprises only image frames of a partly interleaved partly non-interleaved image frame type.

In an embodiment, each of the one or more content light levels apply to all image frames in the coded video sequence in image processing operations.

In an embodiment, the one or more content light levels collectively apply to only a proper subset of image frames in the coded video sequence.

In an embodiment, a second proper subset of image frames in the coded video sequence is applied with different content light levels of the same types as the one or more content light levels.

In an embodiment, the first proper subset of image frames shares a common dependency identifier.

In an embodiment, the first proper subset of image frames shares a common quality identifier.

In an embodiment, the first proper subset of image frames shares a common temporal identifier.

In an embodiment, the first proper subset of image frames shares two or more of: a common view identifier, a common dependency identifier, a common quality identifier, a common quality identifier, etc.

In an embodiment, the one or more content light levels are present in one or more supplemental enhancement information (SEI) messages.

In an embodiment, an SEI message in the one or more SEI messages is present in an instantaneous decoding refresh (IDR) access unit that is coded with an IDR frame.

In an embodiment, the first image frame portion and the second image frame portion exclude a letterbox present in image content as represented in the specific image frame.

FIG. 4B illustrates an example process flow according to an embodiment of the present invention. In some embodiments, one or more computing devices or components (e.g., an upstream encoder, an encoding device/module, a transcoding device/module, a decoding device/module, an inverse tone mapping device/module, a tone mapping device/module, a media device/module, etc.) may perform this process flow.

In block 422, an image processing device (e.g., coding block (120), etc.) generates a coded video sequence (e.g., 204-2 of FIG. 2A or FIG. 2E, etc.) for a plurality of image frames (e.g., 206-2-1, 206-2-2, and so forth, of FIG. 2A or FIG. 2E, etc.). Each image frame in the plurality of image frames in the coded video sequence is (designated) to be rendered by a display device for a different respective frame interval in a plurality of frame intervals. Each image frame in the plurality of image frames in the coded video sequence is of an image frame type among a plurality of image frame types that include a fully non-interleaved image frame type, a fully interleaved image frame type, a partly non-interleaved partly interleaved image frame type, and so forth.

In block 424, based at least in part on pixels of a first image frame (e.g., 206-2-1 of FIG. 2A or FIG. 2E, etc.) of a first image frame type, the image processing device generates one or more first content light levels for a first proper subset of image frames in a set of image frames of the second coded video sequence in the coded video sequence. The first proper subset of image frames includes the first image frame.

In block 426, based at least in part on pixels of a second image frame (e.g., 206-2-2 of FIG. 2A or FIG. 2E, etc.) of a second image frame type different from the first output image type, the image processing device generates one or more second content light levels for a second proper subset of image frames in the coded video sequence. The second proper subset of image frames includes the second image frame. Here, the first proper subset of image frames may be mutually exclusive from the second proper subset of image frames, and may share no common image frame.

In block 428, the image processing device transmits the coded video sequence, along with image metadata that includes the one or more first content light levels and the one or more second content light levels, in a image bitstream (e.g., 122 of FIG. 1, etc.).

In an embodiment, the first proper subset of image frames comprises image frames of a first image frame type; the second proper subset of image frames comprises image frames of a second different image frame type.

In an embodiment, each of the one or more first content light levels apply to all image frames in the first proper subset of image frames in image processing operations; each of the one or more second content light levels apply to all image frames in the second proper subset of image frames in image processing operations.

In an embodiment, the one or more first content light levels are present in a first supplemental enhancement information (SEI) message for at least one image frame in the first proper subset of image frames; the one or more second content light levels are present in a second SEI message for at least one image frame in the second proper subset of image frames.

Figure 4C:
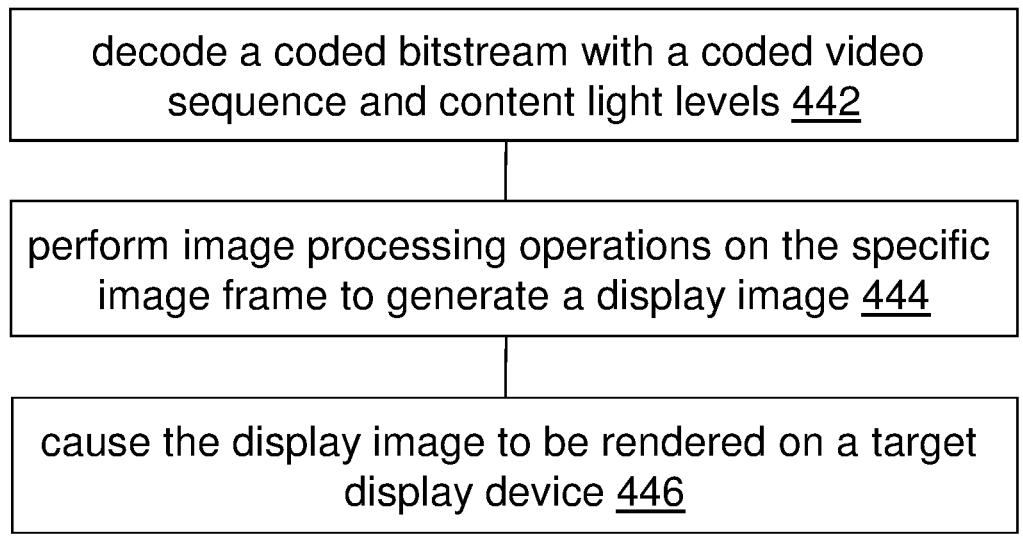

FIG. 4C illustrates an example process flow according to an embodiment of the present invention. In some embodiments, one or more computing devices or components (e.g., a receive device, a set-top box, a smart television, a downstream decoder, a decoding device/module, a media device/module, etc.) may perform this process flow.

In block 442, an image processing device (e.g., decoding block (130), etc.) decodes a image bitstream, which comprises a coded video sequence encoded with a plurality of image frames including a specific image frame, into the plurality of image frames and content light level metadata that includes one or more content light levels for the coded video sequence. The specific image frame comprises pixels generated from source pixels in a set of source images and is to be rendered for a frame interval. The one or more content light levels for the coded video sequence are generated based at least in part on pixels of a first image field, a second image field and a third image field in the specific image frame. The first image field and the second image field that are to be interleaved into a first image frame portion in the specific image frame are generated respectively from a first image and a second image in a set of source images. The first image field is to be rendered for a first frame sub-interval of the frame interval, whereas the second image field is to be rendered for a second frame sub-interval of the frame interval. The second frame sub-interval of the frame interval is subsequent to the first frame sub-interval of the frame interval. The third image field used to occupy all pixel positions in a second image frame portion in the specific image frame is generated from a third image in the set of source images.

In block 444, based at least in part on the one or more content light levels for the coded video sequence, the image processing device performs one or more image processing operations on the specific image frame to generate a display image optimized for a target display device.

In block 446, the image processing device causes the optimized display image to be rendered on the target display device.

In an embodiment, the first image frame portion and the second image frame portion are delineated in the specific image frame based on image content represented by the source pixels in the set of source images.

In an embodiment, the first image frame portion and the second image frame portion are delineated in the specific image frame based on visual characteristic differences in image content in the first image frame portion and the second image frame portion.

In an embodiment, the one or more content light levels comprise at least one of: a maximum frame-average content light level among the plurality of image frames, a maximum content light level, etc., among the plurality of image frames.

In an embodiment, the first image frame portion and the second image frame portion are non-overlapping in the specific image frame.

In an embodiment, the image bitstream represents a H.264 video signal.

In an embodiment, the one or more image processing operations based on the one or more content light levels apply to only a proper subset of image frames in the coded video sequence.

In an embodiment, a second proper subset of image frames in the coded video sequence is applied with different image processing operations based on different content light levels of the same types as the one or more content light levels.

In an embodiment, the first proper subset of image frames shares a common dependency identifier.

In an embodiment, the first proper subset of image frames shares a common quality identifier.

In an embodiment, the first proper subset of image frames shares a common temporal identifier.

In an embodiment, the first proper subset of image frames shares two or more of: a common view identifier, a common dependency identifier, a common quality identifier, a common quality identifier, etc.

In an embodiment, the one or more content light levels are present in one or more supplemental enhancement information (SEI) messages.

In an embodiment, an SEI message in the one or more SEI messages is present in an instantaneous decoding refresh (IDR) access unit that is coded with an IDR frame.

Figure 4D:
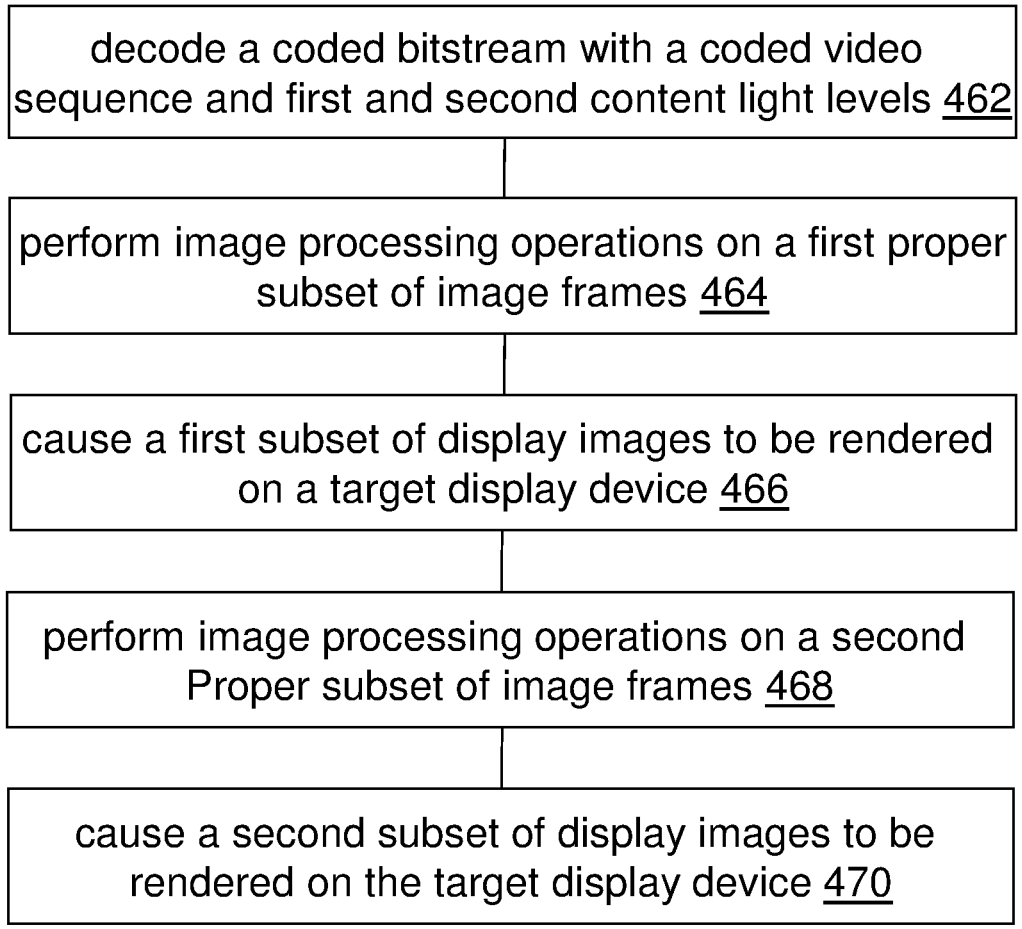

FIG. 4D illustrates an example process flow according to an embodiment of the present invention. In some embodiments, one or more computing devices or components (e.g., a receive device, a set-top box, a smart television, a downstream decoder, a decoding device/module, a media device/module, etc.) may perform this process flow.

In block 462, an image processing device (e.g., decoding block (130), etc.) decodes a image bitstream, which comprises a coded video sequence, into a plurality of image frames and image metadata that includes the one or more first content light levels and the one or more second content light levels. Each image frame in the plurality of image frames is to be rendered for a respective frame interval in a plurality of frame intervals. Each image frame in the plurality of image frames is of an image frame type among a plurality of image frame types that include a fully non-interleaved image frame type, a fully interleaved image frame type, a partly non-interleaved partly interleaved image frame type, and so forth. The one or more first content light levels are generated for a first proper subset of image frames in the coded video sequence based at least in part on pixels of a first image frame of a first image frame type in the first proper subset of image frames. The one or more second content light levels are generated for a second proper subset of image frames in the coded video sequence based at least in part on pixels of a second image frame of a second image frame type different from the first output image type. The second proper subset of image frames includes the second image frame. The first proper subset of image frames shares no common image frame with the second proper subset of image frames.

In block 464, based at least in part on the one or more first content light levels, the image processing device performs one or more first image processing operations on the first proper subset of image frames to generate a first subset of display image optimized for a target display device.

In block 466, the image processing device causes the first subset of display images to be rendered on the target display device.

In block 468, based at least in part on the one or more second content light levels, the image processing device performs one or more second different image processing operations on the second proper subset of image frames to generate a second subset of display image optimized for the target display device.

In block 470, the image processing device causes the second subset of display images to be rendered on the target display device.

In an embodiment, the first proper subset of image frames comprises image frames of a first image frame type; the second proper subset of image frames comprises image frames of a second different image frame type.

In an embodiment, each of the one or more first content light levels apply to all image frames in the first proper subset of image frames in image processing operations; each of the one or more second content light levels apply to all image frames in the second proper subset of image frames in image processing operations.

In an embodiment, the one or more first content light levels are present in a first supplemental enhancement information (SEI) message for at least one image frame in the first proper subset of image frames; the one or more second content light levels are present in a second SEI message for at least one image frame in the second proper subset of image frames.

Figure 4E:
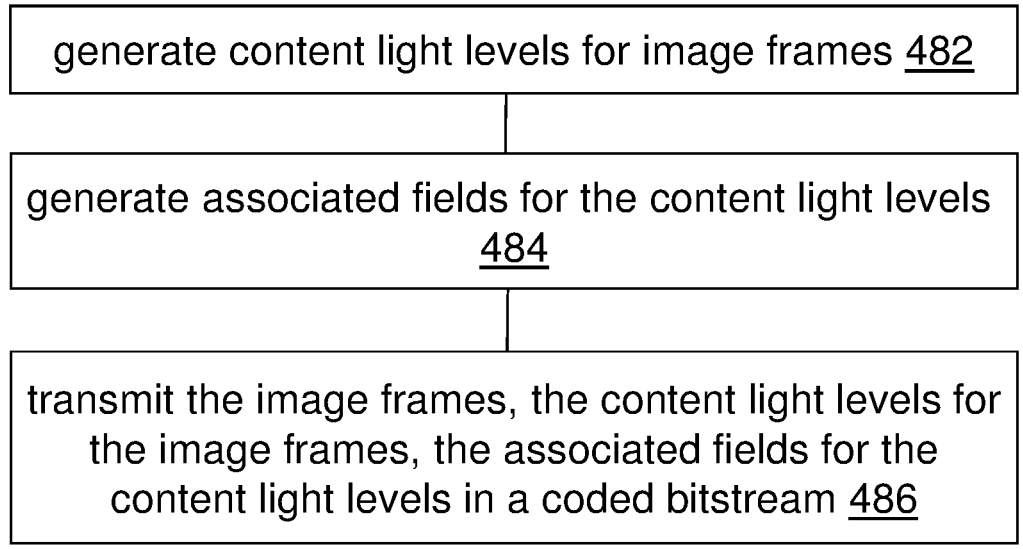

FIG. 4E illustrates an example process flow according to an embodiment of the present invention. In some embodiments, one or more computing devices or components (e.g., an upstream encoder, an encoding device/module, a transcoding device/module, a decoding device/module, an inverse tone mapping device/module, a tone mapping device/module, a media device/module, etc.) may perform this process flow.

In block 482, an image processing device (e.g., coding block (120), etc.) generates one or more content light levels for a plurality of image frames.

In block 484, the image processing device generates one or more associated fields for the one or more content light levels. The one or more associated fields includes at least one of: a type for one of the one or more content light levels, an interpretation for one of the one or more content light levels, an input/output type for one of the one or more content light levels, etc.

In block 486, the image processing device encodes and transmits the plurality of image frames, along with image metadata that includes the one or more content light levels and the one or more associated fields, in a image bitstream.

Figure 4F:
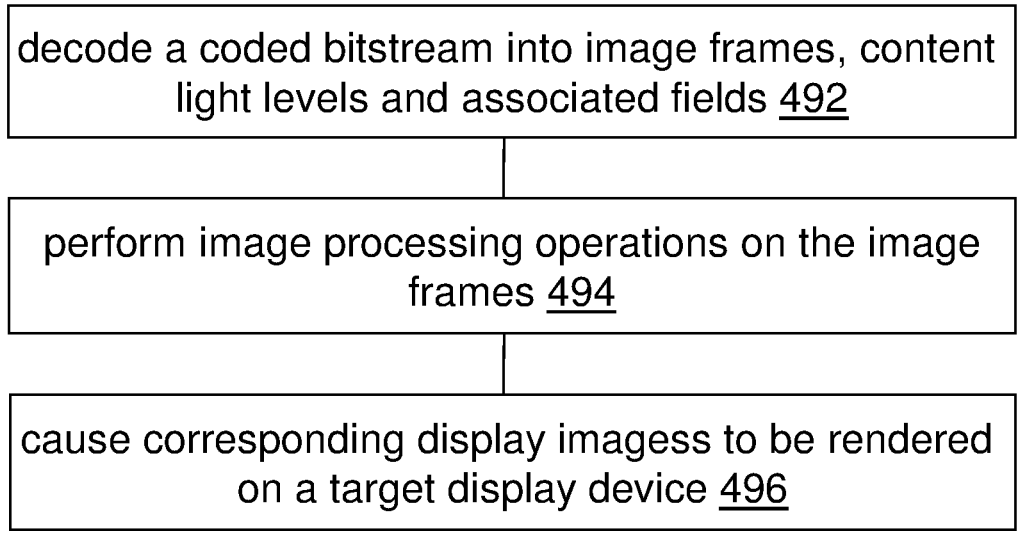

FIG. 4F illustrates an example process flow according to an embodiment of the present invention. In some embodiments, one or more computing devices or components (e.g., a receive device, a set-top box, a smart television, a downstream decoder, a decoding device/module, a media device/module, etc.) may perform this process flow.

In block 492, an image processing device (e.g., decoding block (130), etc.) decodes a image bitstream into a plurality of image frames and image metadata that includes one or more content light levels and one or more associated fields. The one or more associated fields includes at least one of: a type for one of the one or more content light levels, an interpretation for one of the one or more content light levels, an input/output type for one of the one or more content light levels, etc.

In block 494, based at least in part on the one or more content light levels and the one or more associated fields, the image processing device performs one or more image processing operations on the plurality of image frames to generate display images optimized for a target display device.

In block 496, the image processing device causes the optimized display images to be rendered on the target display device.

FIG. 4G illustrates an example process flow according to an embodiment of the present invention. In some embodiments, one or more computing devices or components (e.g., a receive device, a set-top box, a smart television, a downstream decoder, a decoding device/module, a media device/module, etc.) may perform this process flow.

In block 412, an image processing device (e.g., decoding block (130), etc.) receives a coded video sequence in an image bitstream with an associated set of content scan adaptive metadata.

In block 414, the image processing device ascertains if the set of content scan adaptive metadata is received in the bitstream. The set of content scan adaptive metadata includes: a maximum content light level parameter indicating an upper bound on a maximum light level among all individual samples for frames of the coded video sequence; a maximum frame average light level parameter indicating an upper bound on a maximum average light level among the samples for an individual frame of the coded video sequence; and so forth. The maximum content light level parameter and maximum frame average light level parameter are both dependent on a scan type of the frames of the coded video sequence, the scan type being at least one of a progressive frame type, complimentary field pair type, macroblock-adaptive frame-field frame type, individual field picture type, and so forth.

In an embodiment, the scan type is the macroblock-adaptive frame-field frame type, in which field or frame coding is identified for an individual macroblock.

In an embodiment, a content light level type parameter in the bitstream indicates the scan type associated with the maximum content light level parameter.

In an embodiment, the content light level type parameter is at least a 3 bit unsigned integer index for a lookup table.

In an embodiment, a maximum frame average light level type parameter in the bitstream indicates the scan type associated with the maximum frame average light level parameter.

In an embodiment, the maximum frame average light level type parameter is at least a 3 bit unsigned integer index for a lookup table.

In an embodiment, a content light level input-output type parameter in the bitstream indicates an input-output format associated with the maximum content light level parameter.

In an embodiment, the content light level input-output type parameter is at least a 3 bit unsigned integer index for a lookup table.

In an embodiment, content light level input-output type parameter indicates at least one of an input source type, entire coded video sequence type, and live encoding type.

In an embodiment, a maximum frame average light level input-output type parameter in the bitstream indicates an input-output format associated with the maximum frame average light level parameter.

In an embodiment, the maximum frame average light level input-output type parameter is at least a 3 bit unsigned integer index for a lookup table.

In an embodiment, the maximum frame average light level input-output type parameter indicates at least one of an input source type, entire coded video sequence type, live encoding type, etc.

In an embodiment, a maximum content light level interpretation parameter in the bitstream indicates that the maximum content light level parameter is a MaxCLL parameter computed in accordance with CEA Standard 861.3.

In an embodiment, a maximum frame average light level interpretation parameter in the bitstream indicates that the maximum content light level parameter is a MaxFALL parameter computed in accordance with CEA Standard 861.3.

In an embodiment, the image processing device is further configured to perform: in response to determining that the set of content scan adaptive metadata is received, calculating color management algorithm parameters according to the set of content scan adaptive metadata.

In an embodiment, the maximum content light level parameter and the maximum frame average light level parameters are both 16 bit unsigned integers.

FIG. 4H illustrates an example process flow according to an embodiment of the present invention. In some embodiments, one or more computing devices or components (e.g., an upstream encoder, an encoding device/module, a transcoding device/module, a decoding device/module, an inverse tone mapping device/module, a tone mapping device/module, a media device/module, etc.) may perform this process flow.

In block 432, an image processing device (e.g., coding block (120), etc.) generates a set of content scan adaptive metadata, for a coded video sequence, to be included in the bitstream. The set of content scan adaptive metadata includes: a maximum content light level parameter indicating an upper bound on a maximum light level among all individual samples for frames of the coded video sequence; a maximum frame average light level parameter indicating an upper bound on a maximum average light level among the samples for an individual frame of the coded video sequence; and so forth. The maximum content light level parameter and maximum frame average light level parameter are both dependent on a scan type of the frames of the coded video sequence, the scan type being at least one of a progressive frame type, complimentary field pair type, macroblock-adaptive frame-field frame type, individual field picture type, etc.

In block 434, the image processing device transmits the coded video sequence in the bitstream with the set of content scan adaptive metadata.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
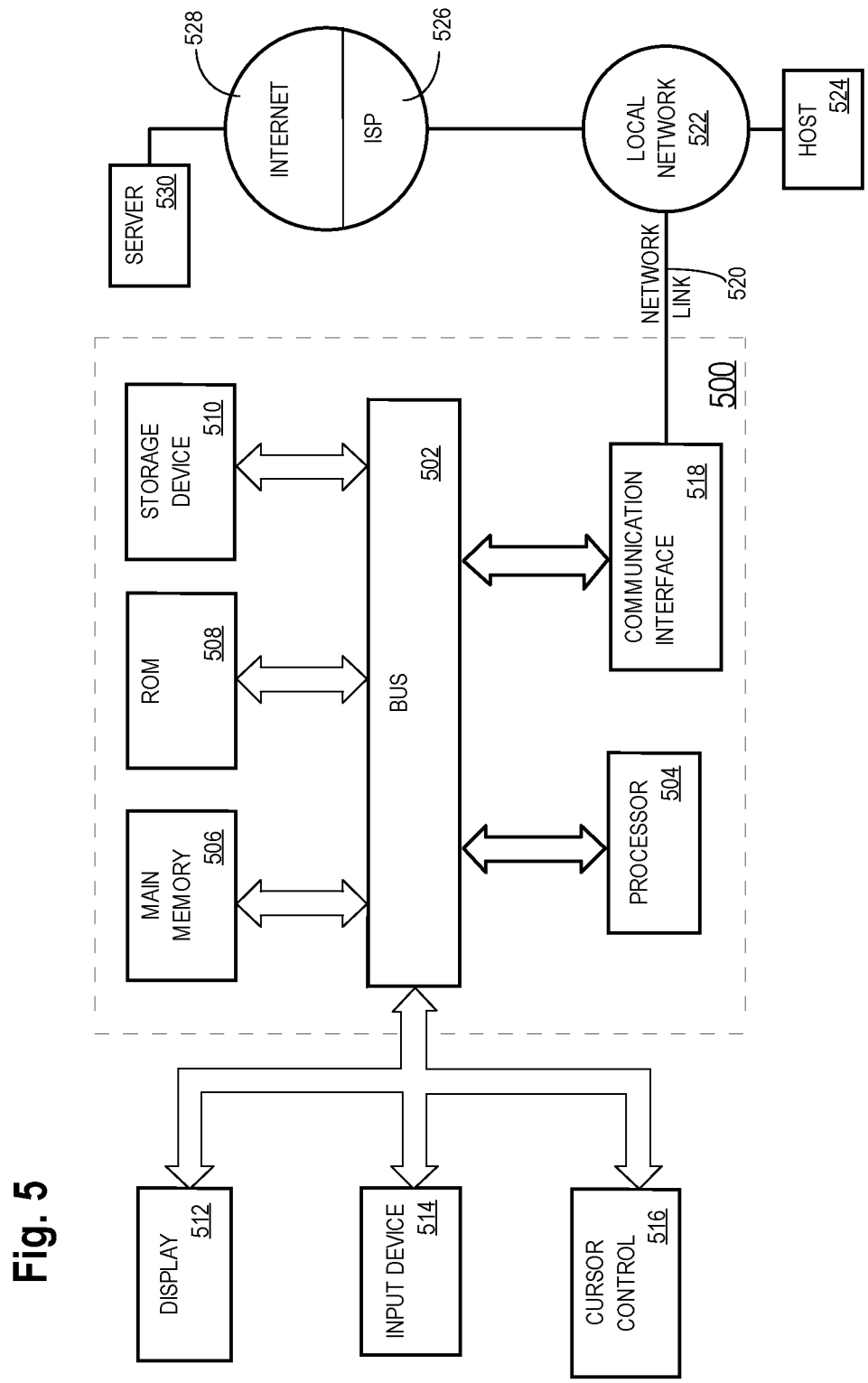
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Exemplary Embodiments

The invention may be embodied in any of the forms described herein, including, but not limited to the following Enumerated Example Embodiments (EEEs) which describe structure, features, and functionality of some portions of the present invention.

EEE1. A method for encoding content light level information with video data, the method comprising:

determining, for a specific image frame in which pixels are generated from source pixels in a set of source images, a first image frame portion in the specific image frame and a second image frame portion in the specific image frame, wherein the specific image frame is to be rendered for a frame interval by a display device;

generating, respectively from a first image and a second image in the set of source images, a first image field and a second image field that are to be interleaved into the first image frame portion in the specific image frame, wherein the first image field is to be rendered for a first frame sub-interval of the frame interval, wherein the second image field is to be rendered for a second frame sub-interval of the frame interval, wherein the second frame sub-interval of the frame interval is subsequent to the first frame sub-interval of the frame interval;

generating, from a third image in the set of source images, a third image field used to occupy all pixel positions in the second image frame portion in the specific image frame;

based at least in part on pixels of the first image field, the second image field and the third image field in the specific image frame, generating one or more content light levels for a coded video sequence to be encoded with a plurality of image frames including the specific image frame;

transmitting the coded video sequence, along with content light level metadata that includes the one or more content light levels, in a image bitstream.

EEE2. The method of EEE1, wherein the first image frame portion and the second image frame portion are delineated in the specific image frame based on image content represented by the source pixels in the set of source images.

EEE3. The method of EEE1, wherein the first image frame portion and the second image frame portion are delineated in the specific image frame based on visual characteristic differences in image content in the first image frame portion and the second image frame portion.

EEE4. The method of EEE1, wherein the one or more content light levels comprise at least one of: a maximum frame-average content light level among the plurality of image frames, or a maximum content light level among the plurality of image frames.

EEE5. The method of EEE4, wherein the one or more content light levels are carried in the image bitstream with one or more associated fields, and wherein the one or more associated fields includes one or more of: an interpretation for the maximum content light level, a type for the maximum content light level, an input/output type for the maximum content light level, an interpretation for the maximum frame average light level, a type for the maximum frame average light level, or an input/output type for the maximum frame average light level.

EEE6. The method of EEE1, wherein the first image frame portion and the second image frame portion are non-overlapping in the specific image frame.

EEE7. The method of EEE1, wherein the image bitstream represents a H.264 video signal.

EEE8. The method of EEE1, wherein the image frame is representable with an array of luma samples for monochrome video content.

EEE9. The method of EEE1, wherein the image frame is representable with an array of luma samples and two corresponding arrays of chroma samples in a color format for polychrome video content.

EEE10. The method of EEE1, wherein the first image frame portion and the second image frame portion collectively represent a visually relevant region in image content represented in the specific image frame.

EEE11. The method of EEE1, wherein the specific image frame is of a partly interleaved partly non-interleaved image frame type; wherein the coded video sequence comprises a second specific image frame that is of one of: a fully interleaved image frame type, or a fully non-interleaved image frame type.

EEE12. The method of EEE1, wherein the coded video sequence comprises only image frames of a partly interleaved partly non-interleaved image frame type.

EEE13. The method of EEE1, wherein each of the one or more content light levels apply to all image frames in the coded video sequence in image processing operations.

EEE14. The method of EEE1, wherein the one or more content light levels collectively apply to only a proper subset of image frames in the coded video sequence.

EEE15. The method of EEE14, wherein a second proper subset of image frames in the coded video sequence is applied with different content light levels of the same types as the one or more content light levels.

EEE16. The method of EEE14, wherein the first proper subset of image frames shares a common dependency identifier.

EEE17. The method of EEE14, wherein the first proper subset of image frames shares a common quality identifier.

EEE18. The method of EEE14, wherein the first proper subset of image frames shares a common temporal identifier.

EEE19. The method of EEE14, wherein the first proper subset of image frames shares two or more of: a common view identifier, a common dependency identifier, a common quality identifier, or a common quality identifier.

EEE20. The method of EEE1, wherein the one or more content light levels are present in one or more supplemental enhancement information (SEI) messages.

EEE21. The method of EEE20, wherein an SEI message in the one or more SEI messages is present in an instantaneous decoding refresh (IDR) access unit that is coded with an IDR frame.

EEE22. The method of EEE1, wherein the first image frame portion and the second image frame portion exclude a letterbox present in image content as represented in the specific image frame.

EEE23. A method for encoding content light level information with video data, the method comprising:
generating a coded video sequence for a plurality of image frames, wherein each image frame in the plurality of image frames is to be rendered by a display device for a respective frame interval in a plurality of frame intervals; wherein each image frame in the plurality of image frames is of an image frame type among a plurality of image frame types that include a fully non-interleaved image frame type, a fully interleaved image frame type, and a partly non-interleaved partly interleaved image frame type;
based at least in part on pixels of a first image frame of a first image frame type, generating one or more first content light levels for a first proper subset of image frames in the coded video sequence, wherein the first proper subset of image frames includes the first image frame;
based at least in part on pixels of a second image frame of a second image frame type different from the first output image type, generating one or more second content light levels for a second proper subset of image frames in the coded video sequence, wherein the second proper subset of image frames includes the second image frame, wherein the first proper subset of image frames shares no common image frame with the second proper subset of image frames;
transmitting the coded video sequence, along with image metadata that includes the one or more first content light levels and the one or more second content light levels, in a image bitstream.

EEE24. The method of EEE23, wherein the first proper subset of image frames comprises image frames of a first image frame type, and wherein the second proper subset of image frames comprises image frames of a second different image frame type.

EEE25. The method of EEE23, wherein each of the one or more first content light levels apply to all image frames in the first proper subset of image frames in image processing operations, and wherein each of the one or more second content light levels apply to all image frames in the second proper subset of image frames in image processing operations.

EEE26. The method of EEE23, wherein the one or more first content light levels are present in a first supplemental enhancement information (SEI) message for at least one image frame in the first proper subset of image frames, and wherein the one or more second content light levels are present in a second SEI message for at least one image frame in the second proper subset of image frames.

EEE27. A method for decoding content light level information with video data, the method comprising:
decoding a image bitstream, which comprises a coded video sequence encoded with a plurality of image frames including a specific image frame, into the plurality of image frames and content light level metadata that includes one or more content light levels for the coded video sequence;
wherein the specific image frame comprises pixels generated from source pixels in a set of source images and is to be rendered for a frame interval;
wherein the one or more content light levels for the coded video sequence are generated based at least in part on pixels of a first image field, a second image field and a third image field in the specific image frame;
wherein the first image field and the second image field that are to be interleaved into a first image frame portion in the specific image frame are generated respectively from a first image and a second image in a set of source images;
wherein the first image field is to be rendered for a first frame sub-interval of the frame interval, wherein the second image field is to be rendered for a second frame sub-interval of the frame interval, wherein the second frame sub-interval of the frame interval is subsequent to the first frame sub-interval of the frame interval;
wherein the third image field used to occupy all pixel positions in a second image frame portion in the specific image frame is generated from a third image in the set of source images;
based at least in part on the one or more content light levels for the coded video sequence, performing one or more image processing operations on the specific image frame to generate a display image optimized for a target display device;
causing the optimized display image to be rendered on the target display device.

EEE28. The method of EEE27, wherein the first image frame portion and the second image frame portion are delineated in the specific image frame based on image content represented by the source pixels in the set of source images.

EEE29. The method of EEE27, wherein the first image frame portion and the second image frame portion are delineated in the specific image frame based on visual characteristic differences in image content in the first image frame portion and the second image frame portion.

EEE30. The method of EEE27, wherein the one or more content light levels comprise at least one of: a maximum frame-average content light level among the plurality of image frames, or a maximum content light level among the plurality of image frames.

EEE31. The method of EEE27, wherein the first image frame portion and the second image frame portion are non-overlapping in the specific image frame.

EEE32. The method of EEE27, wherein the image bitstream represents a H.264 video signal.

EEE33. The method of EEE27, wherein the one or more image processing operations based on the one or more content light levels apply to only a proper subset of image frames in the coded video sequence.

EEE34. The method of EEE33, wherein a second proper subset of image frames in the coded video sequence is applied with different image processing operations based on different content light levels of the same types as the one or more content light levels.

EEE35. The method of EEE33, wherein the first proper subset of image frames shares a common dependency identifier.

EEE36. The method of EEE33, wherein the first proper subset of image frames shares a common quality identifier.

EEE37. The method of EEE33, wherein the first proper subset of image frames shares a common temporal identifier.

EEE38. The method of EEE33, wherein the first proper subset of image frames shares two or more of: a common view identifier, a common dependency identifier, a common quality identifier, or a common quality identifier.

EEE39. The method of EEE27, wherein the one or more content light levels are present in one or more supplemental enhancement information (SEI) messages.

EEE40. The method of EEE39, wherein an SEI message in the one or more SEI messages is present in an instantaneous decoding refresh (IDR) access unit that is coded with an IDR frame.

EEE41. A method for decoding content light level information with video data, the method comprising:

decoding a image bitstream, which comprises a coded video sequence, into a plurality of image frames and image metadata that includes the one or more first content light levels and the one or more second content light levels;

wherein each image frame in the plurality of image frames is to be rendered for a respective frame interval in a plurality of frame intervals; wherein each image frame in the plurality of image frames is of an image frame type among a plurality of image frame types that include a fully non-interleaved image frame type, a fully interleaved image frame type, and a partly non-interleaved partly interleaved image frame type;

wherein the one or more first content light levels are generated for a first proper subset of image frames in the coded video sequence based at least in part on pixels of a first image frame of a first image frame type in the first proper subset of image frames;

wherein the one or more second content light levels are generated for a second proper subset of image frames in the coded video sequence based at least in part on pixels of a second image frame of a second image frame type different from the first output image type, wherein the second proper subset of image frames includes the second image frame, wherein the first proper subset of image frames shares no common image frame with the second proper subset of image frames;

based at least in part on the one or more first content light levels, performing one or more first image processing operations on the first proper subset of image frames to generate a first subset of display image optimized for a target display device;

causing the first subset of display images to be rendered on the target display device;

based at least in part on the one or more second content light levels, performing one or more second different image processing operations on the second proper subset of image frames to generate a second subset of display image optimized for the target display device;

causing the second subset of display images to be rendered on the target display device.

EEE42. The method of EEE41, wherein the first proper subset of image frames comprises image frames of a first image frame type, and wherein the second proper subset of image frames comprises image frames of a second different image frame type.

EEE43. The method of EEE41, wherein each of the one or more first content light levels apply to all image frames in the first proper subset of image frames in image processing operations, and wherein each of the one or more second content light levels apply to all image frames in the second proper subset of image frames in image processing operations.

EEE44. The method of EEE41, wherein the one or more first content light levels are present in a first supplemental enhancement information (SEI) message for at least one image frame in the first proper subset of image frames, and wherein the one or more second content light levels are present in a second SEI message for at least one image frame in the second proper subset of image frames.

EEE45. A method for encoding content light level information with video data, the method comprising:

generating one or more content light levels for a plurality of image frames;

generating one or more associated fields for the one or more content light levels, wherein the one or more associated fields includes at least one of: a type for one of the one or more content light levels, an interpretation for one of the one or more content light levels, or an input/output type for one of the one or more content light levels;

encoding and transmitting the plurality of image frames, along with image metadata that includes the one or more content light levels and the one or more associated fields, in a image bitstream.

EEE46. A method for decoding content light level information with video data, the method comprising:

decoding a image bitstream into a plurality of image frames and image metadata that includes one or more content light levels and one or more associated fields;

wherein the one or more associated fields includes at least one of: a type for one of the one or more content light levels, an interpretation for one of the one or more content light levels, or an input/output type for one of the one or more content light levels;

based at least in part on the one or more content light levels and the one or more associated fields, performing one or more image processing operations on the plurality of image frames to generate display images optimized for a target display device;

causing the optimized display images to be rendered on the target display device.

EEE47. A computer system configured to perform any one of the methods recited in EEEs 1-46.

EEE48. An apparatus comprising a processor and configured to perform any one of the methods recited in EEEs 1-46.

EEE49. A non-transitory computer-readable storage medium having stored thereon computer-executable instruction for executing a method in accordance with any of the EEEs 1-46.

EEE50. A method for processing an image bitstream with an associated set of light level metadata, said method comprising:

receiving a coded video sequence in the bitstream;

ascertaining if the set of light level metadata is received in the bitstream;

wherein the set of light level metadata includes: a first light level parameter (for example, a maximum, minimum, 5% floor, 95% ceiling or the like) indicating a light level among all individual samples for frames of the coded video sequence; and a second light level parameter (for example, average, median, and mean or the like), relating to the samples for an individual frame of the coded video sequence;

wherein the first and second light level metadata parameters are both dependent on a scan type of the frames of the coded video sequence, the scan type being one of a progressive frame type, complimentary field pair type, macroblock-adaptive frame-field frame type, and individual field picture type.

EEE51. The method of EEE50, wherein a third parameter indicates an input-output format associated with the first light level parameter, the second light level parameter or both the first and second light level parameters.

EEE52. The method of EEE50 or claim EEE51, wherein a flag in the bitstream indicates that the first light level parameter, the second light level parameter or both the first and second light level parameters are computed in accordance with a predetermined method (for example, CEA Standard 861.3).

What is claimed is:

1. A method for processing an image bitstream with an associated set of content scan adaptive metadata, said method comprising:
receiving a coded video sequence in the bitstream;
ascertaining if the set of content scan adaptive metadata is received in the bitstream;
wherein the set of content scan adaptive metadata includes:
a maximum content light level parameter indicating an upper bound on a maximum light level among all individual samples for frames of the coded video sequence; and
a maximum frame average light level parameter indicating an upper bound on a maximum average light level among the samples for an individual frame of the coded video sequence;
wherein the maximum content light level parameter and maximum frame average light level parameter are both dependent on a scan type of the frames of the coded video sequence, the scan type being at least one of a progressive frame type, complimentary field pair type, macroblock-adaptive frame-field frame type, and individual field picture type.

2. The method of claim 1 wherein the scan type is the macroblock-adaptive frame-field frame type, in which field or frame coding is identified for an individual macroblock.

3. The method of claim 1, wherein a content light level type parameter in the bitstream indicates the scan type associated with the maximum content light level parameter.

4. The method of claim 3, wherein the content light level type parameter is at least a 3 bit unsigned integer index for a lookup table.

5. The method of claim 1, wherein a maximum frame average light level type parameter in the bitstream indicates the scan type associated with the maximum frame average light level parameter.

6. The method of claim 5, wherein the maximum frame average light level type parameter is at least a 3 bit unsigned integer index for a lookup table.

7. The method of claim 1, wherein a content light level input-output type parameter in the bitstream indicates an input-output format associated with the maximum content light level parameter.

8. The method of claim 7, wherein the content light level input-output type parameter is at least a 3 bit unsigned integer index for a lookup table.

9. The method of claim 7, wherein content light level input-output type parameter indicates at least one of an input source type, entire coded video sequence type, and live encoding type.

10. The method of claim 1, wherein a maximum frame average light level input-output type parameter in the bitstream indicates an input-output format associated with the maximum frame average light level parameter.

11. The method of claim 10, wherein the maximum frame average light level input-output type parameter is at least a 3 bit unsigned integer index for a lookup table.

12. The method of claim 10, wherein maximum frame average light level input-output type parameter indicates at least one of an input source type, entire coded video sequence type, and live encoding type.

13. The method of claim 1, wherein a maximum content light level interpretation parameter in the bitstream indicates that the maximum content light level parameter is a MaxCLL parameter computed in accordance with CEA Standard 861.3.

14. The method of claim 1, wherein a maximum frame average light level interpretation parameter in the bitstream indicates that the maximum content light level parameter is a MaxFALL parameter computed in accordance with CEA Standard 861.3.

15. The method of claim 1 further comprising, if the set of content scan adaptive metadata is received, calculating color management algorithm parameters according to the set of content scan adaptive metadata.

16. The method of claim 1, wherein the maximum content light level parameter and the maximum frame average light level parameters are both 16 bit unsigned integers.

17. A non-transitory computer-readable medium storing a bitstream, the bitstream comprising:
a coded video sequence;
a set of content scan adaptive metadata, the set of content scan adaptive metadata includes:
a maximum content light level parameter indicating an upper bound on a maximum light level among all individual samples for frames of the coded video sequence; and
a maximum frame average light level parameter indicating an upper bound on a maximum average light level among the samples for an individual frame of the coded video sequence;
wherein the maximum content light level parameter and maximum frame average light level parameter are both dependent on a scan type of the frames of the coded video sequence, the scan type being at least one of a progressive frame type, complimentary field pair type, macroblock-adaptive frame-field frame type, and individual field picture type.

18. The non-transitory computer-readable medium of claim 17, wherein the set further comprises:
a content light level type parameter, an index for a lookup table to indicate the scan type associated with the maximum content light level parameter; and
a maximum frame average light level type parameter, an index for a lookup table to indicate the scan type associated with the maximum frame average light level parameter.

19. The non-transitory computer-readable medium of claim 18, wherein the set further comprises:
a maximum content light level interpretation parameter indicating that the maximum content light level parameter is a MaxCLL parameter computed in accordance with CEA Standard 861.3; and
a maximum frame average light level interpretation parameter indicating that the maximum content light level parameter is a MaxFALL parameter computed in accordance with CEA Standard 861.3.

20. The non-transitory computer-readable medium of claim 18, wherein the set further comprises:
a content light level input-output type parameter indicating an input-output format associated with the maximum content light level parameter; and
a maximum frame average light level input-output type parameter indicating an input-output format associated with the maximum frame average light level parameter.

21. An apparatus for video processing, the apparatus comprising:
a non-transitory computer-readable memory;
a bitstream stored on the non-transitory computer-readable memory; and a processor logically coupled to the non-transitory computer-readable memory and configured to process the bitstream,
wherein the bitstream comprises:
  a coded video sequence; and
  a set of content scan adaptive metadata, the set of content scan adaptive metadata includes:
    a maximum content light level parameter indicating an upper bound on a maximum light level among all individual samples for frames of the coded video sequence; and
    a maximum frame average light level parameter indicating an upper bound on a maximum average light level among the samples for an individual frame of the coded video sequence;
wherein the maximum content light level parameter and maximum frame average light level parameter are both dependent on a scan type of the frames of the coded video sequence, the scan type being at least one of a progressive frame type, complimentary field pair type, macroblock-adaptive frame-field frame type, and individual field picture type.

22. A method for delivering an image bitstream with an associated set of content scan adaptive metadata, said method comprising:

generating a set of content scan adaptive metadata, for a coded video sequence, to be included in the bitstream;
wherein the set of content scan adaptive metadata includes:
  a maximum content light level parameter indicating an upper bound on a maximum light level among all individual samples for frames of the coded video sequence; and
  a maximum frame average light level parameter indicating an upper bound on a maximum average light level among the samples for an individual frame of the coded video sequence;
wherein the maximum content light level parameter and maximum frame average light level parameter are both dependent on a scan type of the frames of the coded video sequence, the scan type being at least one of a progressive frame type, complimentary field pair type, macroblock-adaptive frame-field frame type, and individual field picture type;
transmitting the coded video sequence in the bitstream with the set of content scan adaptive metadata.

\* \* \* \* \*